US009680653B1

(12) United States Patent
Bradbury et al.

(10) Patent No.: US 9,680,653 B1
(45) Date of Patent: Jun. 13, 2017

(54) CIPHER MESSAGE WITH AUTHENTICATION INSTRUCTION

(71) Applicant: INTERNATIONAL BUSINESS MACHINES CORPORATION, Armonk, NY (US)

(72) Inventors: Jonathan D. Bradbury, Poughkeepsie, NY (US); Reinhard T. Buendgen, Tuebingen (DE); Dan F. Greiner, San Jose, CA (US); Christian Jacobi, West Park, NY (US); Volodymyr Paprotski, Thornhill (CA); Aditya N. Puranik, Pune (IN); Timothy J. Slegel, Staatsburg, NY (US); Tamas Visegrady, Zurich (CH); Christian Zoellin, Weinstadt (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/292,377

(22) Filed: Oct. 13, 2016

(51) Int. Cl.
 *H04L 9/06* (2006.01)
 *H04L 9/32* (2006.01)
(52) U.S. Cl.
 CPC .......... *H04L 9/3242* (2013.01); *H04L 9/0631* (2013.01); *H04L 9/0637* (2013.01)
(58) Field of Classification Search
 CPC ... H04L 9/0631; H04L 9/0637; H04L 9/0643; H04L 9/3242
 See application file for complete search history.

(56) References Cited

U.S. PATENT DOCUMENTS

| 7,725,736 | B2 | 5/2010 | Lundvall et al. |
| 8,775,794 | B2 | 7/2014 | Benson |
| 2004/0019785 | A1* | 1/2004 | Hawkes ............... H04L 9/0637 713/168 |
| 2006/0126835 | A1* | 6/2006 | Kim ..................... H04L 9/0637 380/44 |
| 2007/0055887 | A1 | 3/2007 | Cross et al. |
| 2011/0320825 | A1 | 12/2011 | Greiner et al. |

FOREIGN PATENT DOCUMENTS

WO   WO2005101975 A2   11/2015

OTHER PUBLICATIONS

Dworkin, NIST Special Publication 800-38D—Recommendation for Block Cipher Modes of Operation: Galois/Counter Mode (GCM) and GMAC, NIST, 2007.*

(Continued)

*Primary Examiner* — Minh Dinh
(74) *Attorney, Agent, or Firm* — William A. Kinnaman, Jr. Esq.; Blanche E. Schiller, Esq.; Heslin Rothenberg Farley & Mesiti P.C.

(57) ABSTRACT

An instruction to perform ciphering and authentication is executed. The executing includes ciphering one set of data provided by the instruction to obtain ciphered data and placing the ciphered data in a designated location. It further includes authenticating an additional set of data provided by the instruction, in which the authenticating generates at least a part of a message authentication tag. The at least a part of the message authentication tag is stored in a selected location.

20 Claims, 20 Drawing Sheets

(56) References Cited

OTHER PUBLICATIONS

Gueron, Recent development in AES-GCM authenticated encryption optimization and deployment, and its nonce misuse resistant version GCM-SIV, Recent Advances in Authenticated Encryption, Sep. 2016.*

Gueron et al., Intel Carry-Less Multiplication Instruction and its Usage for Computing the GCM Mode—Rev 2.02, Intel, 2014.*

Gopal et al., Optimized Galois-Counter-Mode Implementation on Intel Architecture Processors, Intel, 2010.*

Gouvea et al., Implementing GCM on ARMv8, Springer International Publishing Switzerland, 2015.*

Jankowski et al., Packed AES-GCM Algorithm Suitable for AES/PCLMULQDQ Instructions, IEEE, 2011.*

Khan et al., Analysis and optimization of Galois/Counter Mode (GCM) using MPI, ResearchGate, 2015.*

McGrew et al., The Galois/Counter Mode of Operation (GCM), NIST, 2005.*

Ehrman, John R., "High Level Assembler Release 4: New/Updated Features and Functions," SHARE 102 Session 8164, Feb. 2004, pp. 1-18.

Shuai et al., "Research of Cipher Chip Core for Sensor Data Encryption," IEEE Sensors Journal, vol. 16, No. 12, Jun. 2016, pp. 4949-4954.

IBM, "z/Architecture—Principles of Operation," IBM Publication No. SA22-7832-10, Eleventh Edition, Mar. 2015, pp. 1-1732.

IBM, Power ISA, V2.07B, Apr. 2015, pp. 1-1527.

* cited by examiner

400

| RESERVED | |
|---|---|
| RESERVED | COUNTER VALUE (CV) | ~402
| TAG (T) | | ~404
| HASH SUBKEY (H) | | ~406
| TOTAL AAD LENGTH (TAADL) | | ~408
| TOTAL PLAINTEXT / CIPHERTEXT LENGTH (TPCL) | | ~410
| INITIAL COUNTER VALUE ($J_0$) | | ~412
| CRYPTOGRAPHIC KEY (K, FOR FUNCTIONS 18-20) ENCRYPTED CRYPTOGRAPHIC KEY ($WK_a(K)$, FOR FUNCTIONS 26-28) | | ~414
| AES WRAPPING-KEY VERIFICATION PATTERN ($WK_aVP$) (PRESENT FOR FUNCTIONS 26-28) | | ~418

FIG. 4

CIPHER MESSAGE WITH AUTHENTICATION INSTRUCTION

BACKGROUND

One or more aspects relate, in general, to processing within a computing environment, and in particular, to processing associated with ciphering and authentication of data.

Secure message transmission in an electronic information processing context involves encryption and decryption of messages, as well as authentication. A message is encrypted by the sender prior to transmission to ensure that inspection of the encrypted message does not reveal its true content to a third party. On the other hand, a message is decrypted by a recipient to reveal the original content. Additionally, message authentication ensures that the content of the message provided by the sender has not been accidentally or maliciously altered during transmission. Thus, the message received is, in fact, the same as that which was sent.

The U.S. National Institute of Science and Technology (NIST) Special Publication 800-38D, Recommendation for Block Cipher Modes of Operation: Galois/Counter Mode (GCM) and GMAC, (GMAC: Galois Message Authentication Code), describes the following operations:

Authentication of additional authenticated data using a Galois Hashing (GHASH) algorithm described in NIST SP 800-38D. An example of additional authenticated data is the network routing information for a message. This data is not encrypted so that a network router may properly dispatch the message; however, the routing information may need to be authenticated, for example, to ensure that the data came from the expected source.

Ciphering of the message using an approved symmetric key-block cipher with a block size of 128 bits, such as the advanced encryption standard (AES). To minimize potential repeatability of ciphered blocks, the ciphering technique uses an incrementing counter from one block to the next that is included in the ciphering process.

Authentication of the encrypted message data using GHASH.

Separate individual instructions are available to perform ciphering of a message using a variety of ciphering algorithms, and for producing a message digit for the message.

SUMMARY

Shortcomings of the prior art are overcome and additional advantages are provided through the provision of a computer program product for facilitating processing in a computing environment. The computer program product comprises a storage medium readable by a processing circuit and storing instructions for execution by the processing circuit for performing a method. The method includes, for instance, obtaining an instruction to perform a plurality of operations, including ciphering and authentication, and executing the instruction. The executing includes ciphering one set of data provided by the instruction to obtain ciphered data and placing the ciphered data in a designated location. It further includes authenticating an additional set of data provided by the instruction, in which the authenticating generates at least a part of a message authentication tag. The at least a part of the message authentication tag is stored in a selected location. In a further embodiment, the executing further includes authenticating the ciphered data.

One instruction is provided that is capable of generating a message digest for additional authenticated data, ciphering a message and generating a message digest for the enciphered message. This improves system performance by reducing the number of instructions to be fetched, decoded and executed, and by reducing the number of times the ciphertext is to be fetched.

In one example, the additional set of data includes at least one block of data of one or more blocks of data, and the executing further includes determining whether the additional set of data includes a last block of data to be authenticated. The authenticating is performed based on whether the additional set of data includes the last block of data to be authenticated. The determining includes, for instance, checking a last additional authenticated data control of the instruction to determine whether the additional set of data includes the last block of data to be authenticated. The last additional authenticated data control indicates whether or not the final block of additional authenticated data has been provided, and allows a single instruction to handle first, intermediate and final blocks of additional authenticated data.

Further, in one example, the one set of data includes at least one block of data of one or more blocks of data, and the executing further includes determining whether the one set of data includes a last block of data to be ciphered. The ciphering is performed based on whether the one set of data includes the last block of data to be ciphered. The determining includes, for instance, checking a last text control of the instruction to determine whether the one set of data includes the last block of data to be ciphered. The last text control indicates whether or not the final block of plaintext/ciphertext has been provided, and allows a single instruction to handle first, intermediate and final blocks of plaintext/ciphertext.

As examples, the ciphering includes encrypting the one set of data based on a control provided by the instruction being set to a selected value, or decrypting the one set of data based on a control provided by the instruction being set to a particular value.

In one embodiment, the authenticating of the additional set of data includes using a hash technique to generate the at least a part of the message authentication tag. In one embodiment, the hash technique uses a hash subkey stored in a parameter block used by the instruction, based on a hash subkey supplied control of the instruction being set to a chosen value. The hash subkey supplied control allows the program to indicate that it has provided its own hash subkey, thus providing a performance benefit if using the same hash subkey.

As an example, the one set of data includes at least a portion of a message and the additional set of data includes routing information for the message.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 4 depicts one example of a format of a parameter block for use by the Cipher Message with Authentication instruction of FIG. 3A, in accordance with an aspect of the present invention;

DETAILED DESCRIPTION

In accordance with one or more aspects, a single instruction (e.g., a single architected hardware machine instruction at the hardware/software interface) is provided that combines the functions of authentication and ciphering. For example, a single instruction is provided that combines the functions of producing a message authentication tag (for both additional authenticated data and messages) with the ciphering of a message. Although, in one embodiment, the instruction performs ciphering and authentication conforming to the Galois/Counter Mode specification, in other embodiments, the instruction may use additional and/or other algorithms to perform ciphering and authentication. The instruction is referred to herein as a Cipher Message with Authentication instruction.

As described above, separate instructions are available to perform ciphering for a message using a variety of ciphering algorithms, including the data encryption algorithm, the triple data encryption algorithm, and the advanced encryption standard; and for producing a message digest. Further, other functions are available to perform various hashing algorithms, including GHASH. However, there is no single instruction that combines message ciphering and message authentication, including the authentication of additional authenticated data. Thus, in accordance with an aspect of the invention, such an instruction, e.g., the Cipher Message with Authentication instruction, is provided that combines message ciphering and authentication One embodiment of a computing environment to incorporate and use one or more aspects of the present invention is described with reference to FIG. 1A. In one example, the computing environment is based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. Z/ARCHITECTURE is a registered trademark of International Business Machines Corporation, Armonk, N.Y., USA.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The computing environment may also be based on other architectures, including, but not limited to, the Intel x86 architectures. Other examples also exist.

Figure 1A:
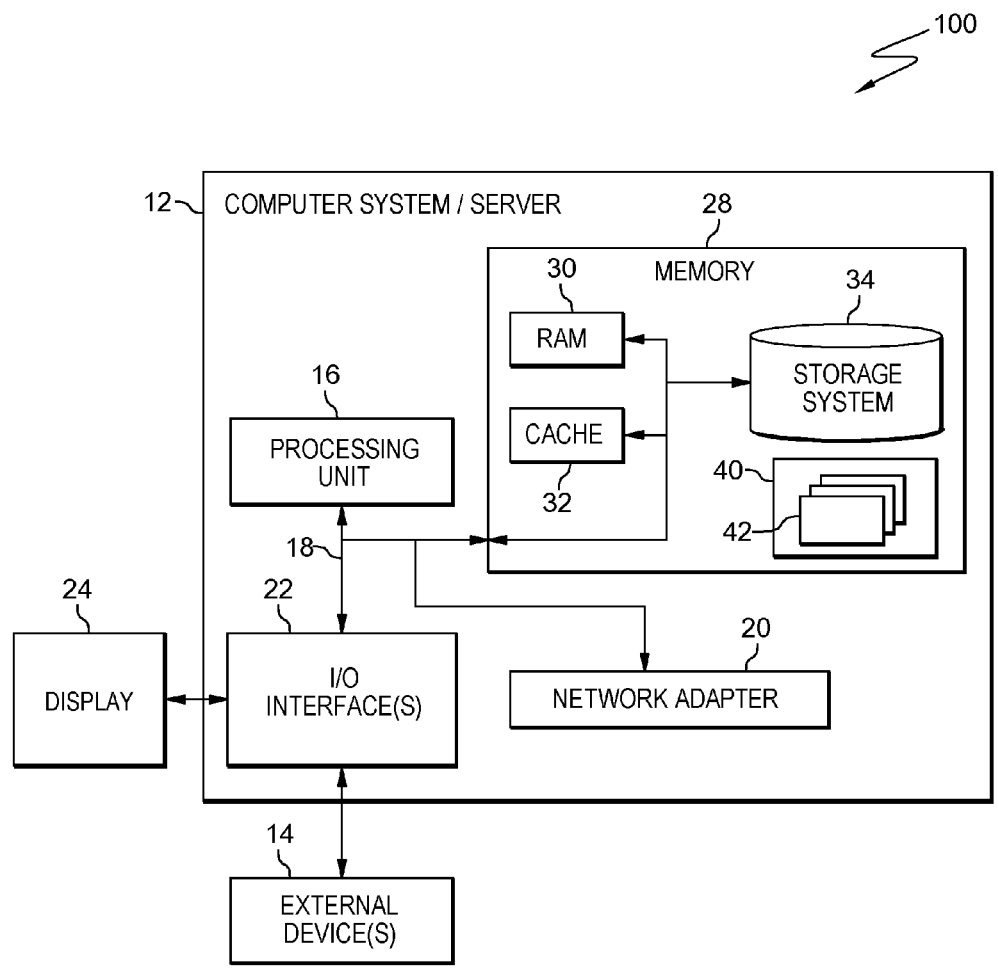
FIG. 1A depicts one example of a computing environment to incorporate and use one or more aspects of the present invention.

As shown in FIG. 1A, a computing environment 100 includes, for instance, a computer system/server 12, which may include, but is not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 1B:
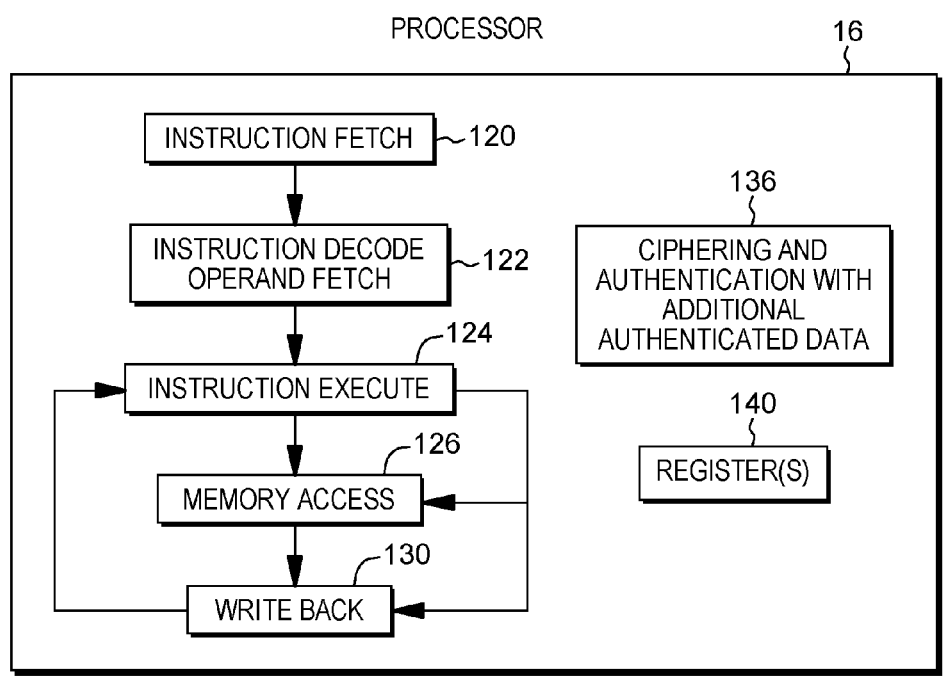
FIG. 1B depicts further details of the processor of FIG. 1A.

In one example, processor 16 includes a plurality of functional components used to execute instructions. As depicted in FIG. 1B, these functional components include, for instance, an instruction fetch component 120 to fetch instructions to be executed; an instruction decode unit 122 to decode the fetched instructions and to obtain operands of the decoded instructions; instruction execute components 124 to execute the decoded instructions; a memory access component 126 to access memory for instruction execution, if necessary; and a write back component 130 to provide the results of the executed instructions. One or more of these components may, in accordance with an aspect of the present invention, provide ciphering and authentication operations 136, including authentication of additional authenticated data, as described herein.

Processor 16 also includes, in one embodiment, one or more registers 140 to be used by one or more of the functional components.

Figure 2A:
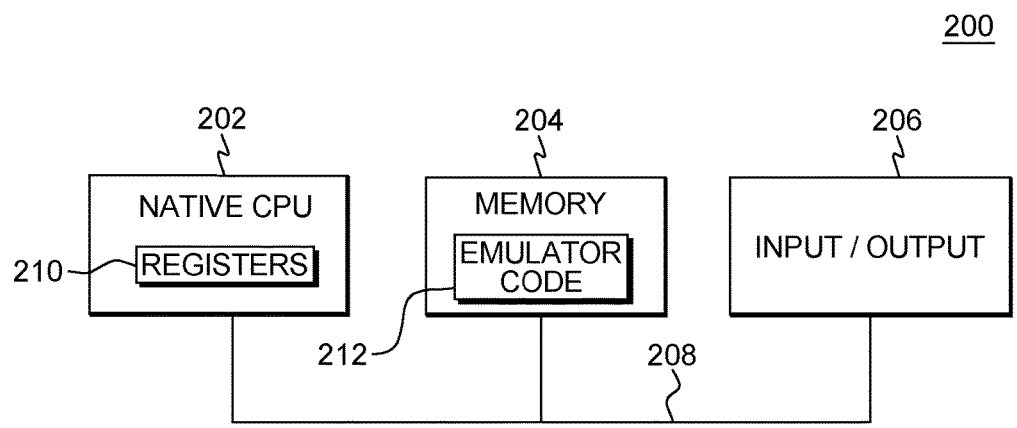
FIG. 2A depicts another example of a computing environment to incorporate and use one or more aspects of the present invention.

Another embodiment of a computing environment to incorporate and use one or more aspects is described with reference to FIG. 2A. In this example, a computing environment 200 includes, for instance, a native central processing unit (CPU) 202, a memory 204, and one or more input/output devices and/or interfaces 206 coupled to one another via, for example, one or more buses 208 and/or other connections. As examples, computing environment 200 may include a PowerPC processor or a pSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment. These registers include information that represent the state of the environment at any particular point in time.

Moreover, native central processing unit 202 executes instructions and code that are stored in memory 204. In one particular example, the central processing unit executes emulator code 212 stored in memory 204. This code enables the computing environment configured in one architecture to emulate another architecture. For instance, emulator code 212 allows machines based on architectures other than the z/Architecture, such as PowerPC processors, pSeries servers, HP Superdome servers or others, to emulate the z/Architecture and to execute software and instructions developed based on the z/Architecture.

Figure 2B:
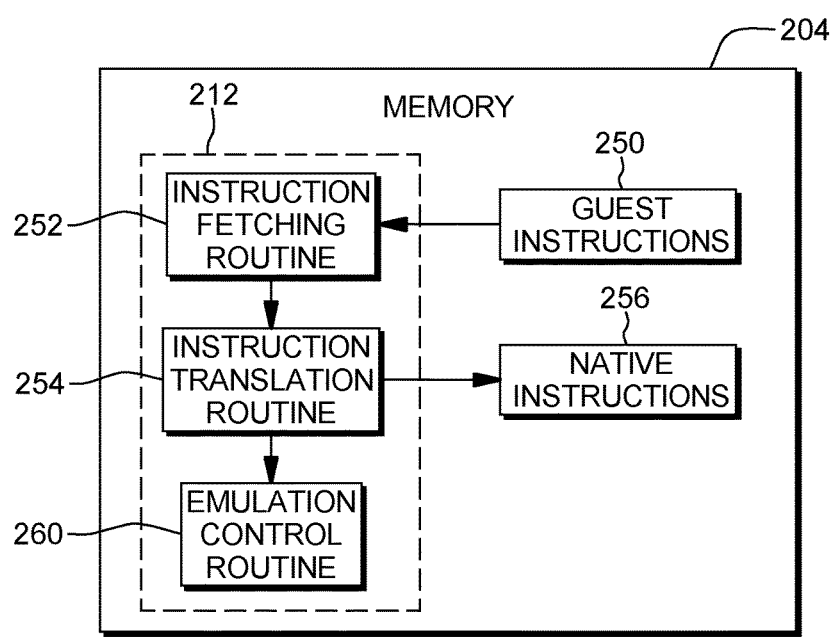
FIG. 2B depicts further details of the memory of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native CPU 202. For example, guest instructions 250 may have been designed to execute on a z/Architecture processor 16, but instead, are being emulated on native CPU 202, which may be, for example, an Intel Itanium II processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In one example, a guest instruction 250 that is obtained, translated and executed is the Cipher Message with Authentication instruction described herein. The instruction, which is of one architecture (e.g., the z/Architecture), is fetched from memory, translated and represented as a sequence of native instructions 256 of another architecture (e.g., PowerPC, pSeries, Intel, etc.). These native instructions are then executed.

Details relating to one embodiment of a Cipher Message with Authentication instruction, including explicit and implicit fields of the instruction, as well as execution by a processor (either in a native or emulated system), are described herein. In accordance with an aspect of the present invention, the Cipher Message with Authentication instruction is a single instruction that combines the functions of producing a message authentication tag, for both additional authenticated data and a message, with the ciphering of the message.

Figure 3A:
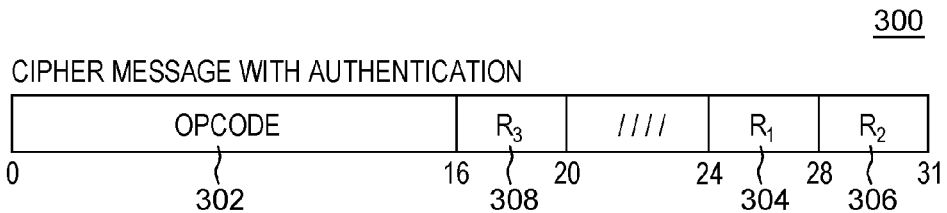
FIG. 3A depicts one embodiment of a format of a Cipher Message with Authentication instruction, in accordance with an aspect of the present invention.

One embodiment of a Cipher Message with Authentication instruction is described with reference to FIG. 3A. In one example, a Cipher Message with Authentication instruction 300 includes an opcode field 302 (e.g., bits 0-15) having an operation code (opcode) to indicate a cipher message with authentication operation; a first register field 304 (e.g., bits 24-27) used to designate at least one first register ($R_1$); a second register field 306 (e.g., bits 28-31) used to designate at least one second register ($R_2$); and a third register field 308 (e.g., bits 16-19) used to designate at least one third register ($R_3$). Each of the fields 304-308, in one example, is separate and independent from the opcode field. Further, in one embodiment, they are separate and independent from one another; however, in other embodiments, more than one field may be combined.

In one example, the contents of the even-numbered register designated by the $R_1$ field contains an address of the first operand. Further, the contents of the even-odd register pairs designated by the $R_2$ field and the $R_3$ field contain the address and length of the second and third operands, respectively.

In addition to $R_1$, $R_2$, and $R_3$ encoded in the instruction, one implementation of the instruction uses one or more implied registers including, for instance, general register 0 (GR0) and general register 1 (GR1). Each of the registers is further described below with reference to FIGS. 3B-3H.

Figure 3B:
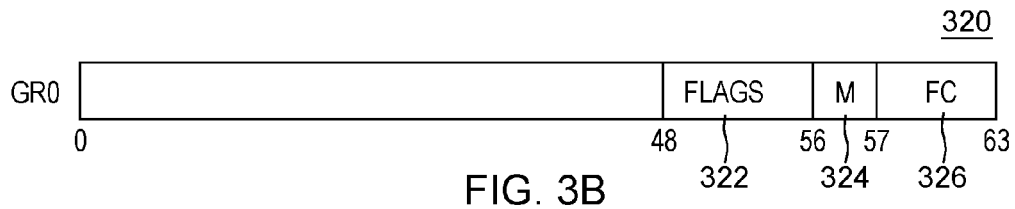
FIG. 3B depicts one example of the contents of a general register, general register 0 (GR0), to be used by one or more aspects of the Cipher Message with Authentication instruction of FIG. 3A, in accordance with an aspect of the present invention.

Referring initially to FIG. 3B, one embodiment of a format of general register 0 (320) is described. In one example, general register 0 includes a flags (F) field 322 (e.g., bits 48-55), a modifier (M) control 324 (e.g., bit 56), and a function code (FC) field 326 (e.g., bits 57-63). Each of the fields is further described below.

Flags (F) 322: Bit positions 48-55 of general register 0 contain an 8-bit flags field controlling the operation of the function. The flags field is meaningful when the function code in bits 57-63 of general register 0 designates a ciphering function (that is, when the function code is nonzero). The format of the flags field is as follows, in one example:

Reserved: Bits 0-4 of the flags field are reserved and should contain zeros; otherwise, the program may not operate compatibly in the future.

Hash Subkey Supplied (HS) Flag: Bit 5 of the flags field indicates whether the hash subkey (H) field in a parameter block (described below) contains a valid hash subkey. The HS flag is meaningful when the function code is nonzero, and the function does not use an encrypted cryptographic key; the HS flag is ignored for functions that use an encrypted cryptographic key.

Last Additional Authenticated Data (LAAD) Flag: Bit 6 of the flags field qualifies the contents of the third operand. When the LAAD flag is one, it indicates that the third operand designates the last series of additional authenticated data blocks. When the LAAD flag is zero, it indicates that the third operand does not designate the last series of additional authenticated data blocks.

Last Plaintext/Ciphertext (LPC) Flag (also referred to herein as last text control): Bit 7 of the flags field qualifies the contents of the second operand. When the LPC flag is one, it indicates that the second operand designates the last series of plaintext or ciphertext blocks. When the LPC flag is zero, it indicates that the second operand does not designate the last series of plaintext or ciphertext blocks.

A specification exception is recognized, and the operation is suppressed when the LPC flag is one, and the LAAD flag is zero.

Modifier (M) 324: When the function code in bits 57-63 of general register 0 is nonzero, bit position 56 of general register 0 contains a modifier control indicating encryption or decryption is to be performed by the function. When the M control is zero, the function performs encryption of the second operand; when the M control is one, the function performs decryption of the second operand. The M control is ignored when the function code is zero.

Function Code (FC) 326: Bit positions 57-63 of general register 0 contain the function code. In operation of the instruction, a function specified by the function code is performed. Examples of assigned function codes for Cipher Message with Authentication include:

| Code | Function | Param. Block Size (Bytes) | Data Block Size (bytes) |
|---|---|---|---|
| 0 | KMA-Query | 16 | — |
| 18 | KMA-GCM-AES-128 | 96 | 16 |
| 19 | KMA-GCM-AES-192 | 104 | 16 |

-continued

| Code | Function | Param. Block Size (Bytes) | Data Block Size (bytes) |
|---|---|---|---|
| 20 | KMA-GCM-AES-256 | 112 | 16 |
| 26 | KMA-GCM-Encrypted-AES-128 | 128 | 16 |
| 27 | KMA-GCM-Encrypted-AES-192 | 136 | 16 |
| 28 | KMA-GCM-Encrypted-AES-256 | 144 | 16 |

Bits 0-31 of general register 0 are ignored. Bits 32-47 of general register 0 are reserved and should contain zeros; otherwise, the program may not operate compatibly in the future.

The query function (e.g., function code 0) provides the means of indicating the availability of the other functions. The contents of general registers $R_1$, $R_2$, $R_2+1$, $R_3$, and $R_3+1$ are ignored for the query function.

For functions other than the query function (that is, for functions having a nonzero function code), a message authentication tag is formed from the contents of the third operand and from the contents of either the resulting first operand or the second operand, depending on whether the M control is 0 or 1, respectively. Based on the M control, the second operand is either encrypted or decrypted using a cryptographic key and counter values from a parameter block (described below), and the result is placed in the first operand location.

Figure 3C:
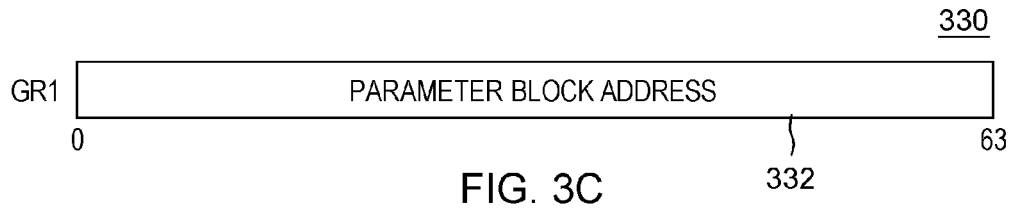
FIG. 3C depicts one example of the contents of another general register, general register 1 (GR1), to be used by the Cipher Message with Authentication instruction of FIG. 3A, in accordance with an aspect of the present invention.

As shown in FIG. 3C, general register 1 (330) contains a logical address 332 of the leftmost byte of a parameter block in storage. In the 24-bit addressing mode, the contents of bit positions 40-63 of general register 1 constitute the address, and the contents of bit positions 0-39 are ignored. In the 31-bit addressing mode, the contents of bit positions 33-63 of general register 1 constitute the address, and the contents of bit positions 0-32 are ignored. In the 64-bit addressing mode, the contents of bit positions 0-63 of general register 1 constitute the address.

Figure 3D:
FIG. 3D depicts one example of the contents of a register $R_1$ to be used in one or more aspects by the Cipher Message with Authentication instruction of FIG. 3A, in accordance with an aspect of the present invention.
Figure 3E:
FIG. 3E depicts one example of the contents of a register $R_2$ to be used in one or more aspects by the Cipher Message with Authentication instruction of FIG. 3A, in accordance with an aspect of the present invention.
Figure 3F:
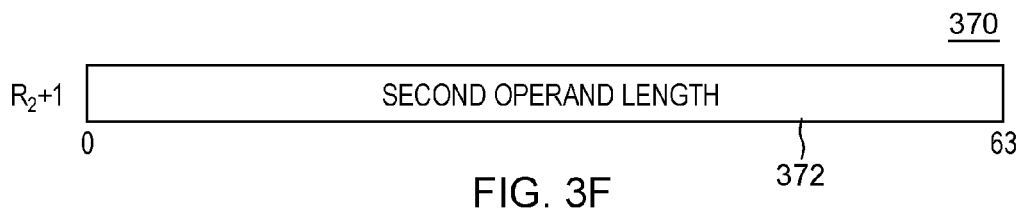
FIG. 3F depicts one example of the contents of a register $R_2+1$ to be used in one or more aspects by the Cipher Message with Authentication instruction of FIG. 3A, in accordance with an aspect of the present invention.
Figure 3G:
FIG. 3G depicts one example of the contents of a register $R_3$ to be used in one or more aspects by the Cipher Message with Authentication instruction of FIG. 3A, in accordance with an aspect of the present invention.
Figure 3H:
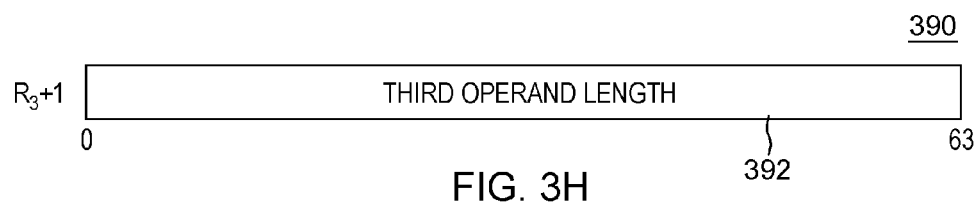
FIG. 3H depicts one example of the contents of a register $R_3+1$ to be used in one or more aspects by the Cipher Message with Authentication instruction of FIG. 3A, in accordance with an aspect of the present invention.

Referring to FIG. 3D, the $R_1$ field (304) designates a general register and is to designate an even-numbered register; otherwise, a specification exception is recognized. The $R_2$ and $R_3$ fields each designate an even-odd pair of general registers and each is to designate an even-numbered register; otherwise, a specification exception is recognized. A specification exception is also recognized if the $R_3$ field designates the same register as either the $R_1$ or $R_2$ fields.

The location of the leftmost byte of the first, second, and third operands is specified by the contents of general registers $R_1$ 304 (FIG. 3D), $R_2$ 306 (FIG. 3E) and $R_3$ 308 (FIG. 3G), respectively. The number of bytes in the second operand location is specified in general register $R_2+1$ (370, FIG. 3F). The first operand is the same length as the second operand. The number of bytes in the third operand location is specified in general register $R_3+1$ (390, FIG. 3H).

As part of the operation, the address 382 in general register $R_3$ (380, FIG. 3G) is incremented by the number of third operand bytes processed, and the length 392 in general register $R_3+1$ (390) is decremented by the same number; additionally, the addresses 342, 362 in general registers $R_1$ and $R_2$ are each incremented by the number of second operand bytes processed, and the length 372 in general register $R_2+1$ (370) is decremented by the same number. The formation and updating of the addresses and length is dependent on the addressing mode.

For instance, in the 24-bit addressing mode, the contents of bit positions 40-63 of general registers $R_1$, $R_2$ and $R_3$ constitute the addresses of the first, second and third operands, respectively, and the contents of bit positions 0-39 are ignored; bits 40-63 of the updated addresses replace the corresponding bits in general registers $R_1$, $R_2$ and $R_3$, carries out of bit position 40 of the updated address are ignored, and the contents of bit position 32-39 of general registers $R_1$, $R_2$ and $R_3$ are set to zeros. In the 31-bit addressing mode, the contents of bit positions 33-63 of general registers $R_1$, $R_2$ and $R_3$ constitute the addresses of the first, second, and third operands, respectively, and the contents of bit positions 0-32 are ignored; bits 33-63 of the updated addresses replace the corresponding bits in general registers $R_1$, $R_2$ and $R_3$, carries out of bit position 33 of the updated address are ignored, and the content of bit position 32 of general registers $R_1$, $R_2$ and $R_3$ is set to zero. In the 64-bit addressing node, the contents of bit positions 0-63 of general registers $R_1$, $R_2$, and $R_3$ constitute the addresses of the first, second and third operands, respectively; bits 0-63 of the updated addresses replace the contents of general registers $R_1$, $R_2$ and $R_3$ and carries out of it position 0 are ignored.

In both the 24-bit and the 31-bit addressing modes, the contents of bit positions 32-63 of general register $R_2+1$ form a 32-bit unsigned binary integer which specifies the number of bytes in the first and second operands, and the contents of bit positions 0-31 are ignored; bits 32-63 of the updated value replace the corresponding bits in general register $R_2+1$. In the 64-bit addressing mode, the contents of bit positions 0-63 of general register $R_2+1$ form a 64-bit unsigned binary integer which specifies the number of bytes in the first and second operands; the updated value replaces the contents of general register $R_2+1$.

In both the 24-bit and the 31-bit addressing modes, the contents of bit positions 32-63 of general register $R_3+1$ form a 32-bit unsigned binary integer which specifies the number of bytes in the third operand, and the contents of bit positions 0-31 are ignored; bits 32-63 of the updated value replace the corresponding bits in general register $R_3+1$. In the 64-bit addressing mode, the contents of bit positions 0-63 of general register $R_3+1$ form a 64-bit unsigned binary integer which specifies the number of bytes in the third operand; the updated value replaces the contents of general register $R_3+1$.

In the 24-bit or 31-bit addressing mode, the contents of bit positions 0-31 of general registers $R_1$, $R_2$, $R_2+1$, $R_3$, and $R_3+1$ remain unchanged.

In the access register mode, access registers 1, $R_1$, $R_2$, and $R_3$ specify the address spaces containing the parameter block, first, second, and third operands, respectively.

Each of the functions is described below:

Query (Function Code 0)

This function uses a parameter block that includes, e.g., a 128-bit status word stored in the parameter block. Bits 0-127 of this field correspond to function codes 0-127, respectively, of the Cipher Message with Authentication instruction. When a bit is one, the corresponding function is installed; otherwise, the function is not installed.

Condition code 0 is set when execution of the query function completes; condition codes 1, 2, and 3 are not applicable to this function.

Galois/Counter Mode (GCM)-AES Functions (Selective Nonzero Function Codes)

In one embodiment, there are six GCM-AES functions:
GCM-AES-128 (function code 18)
GCM-AES-192 (function code 19)
GCM-AES-256 (function code 20)
GCM-Encrypted AES-128 (function code 26)
GCM-Encrypted AES-192 (function code 27)
GCM-Encrypted AES-256 (function code 28)

These functions also use a parameter block, and one example of a parameter block used for the GCM-AES functions is described with reference to FIG. 4. In one example, a parameter block 400 includes:

Reserved: Bytes 0-11 of the parameter block are reserved. The reserved field may contain unpredictable values of the instruction.

Counter Value (CV) 402: Bytes 12-15 of the parameter block contain, e.g., a 32-bit binary integer. The leftmost 12 bytes of the initial counter value 412 ($J_0$, in bytes 64-79 of the parameter block) are concatenated with the contents of the CV field on the right to form the initial counter block (ICB) that is used by a GCTR (Galois Counter) function, described below.

For each execution of the instruction, the CPU increments the CV field in the parameter block by the number of second operand blocks processed. A carry out of bit position 0 of the CV field is ignored.

Tag (T) 404: Bytes 16-31 of the parameter block contain the message authentication tag field.

For each block of the third operand, and for each block of the resulting first operand (when M is 0) or each block of the second operand (when M is 1), the CPU uses the tag field as both input and output to a Galois Hash (GHASH) function, described below. When all additional authenticated data and ciphertext has been hashed, the concatenation of the TAADL 408 and TPCL 410 fields (described below) are hashed using GHASH, and the results of the hash are encrypted using the GCTR function to produce a last tag (T) field in the parameter block.

Hash Subkey (H) 406: For the GCM-AES functions, bytes 32-47 of the parameter block contain, e.g., a 128-bit hash subkey that is used by the GHASH functions of the instruction. When the hash subkey supplied flag (HS, bit 53 of general register 0) is zero, the CPU computes the hash subkey by encrypting 128 bits of binary zeros using the cryptographic key (K), stores the hash subkey in the H field, and sets the HS flag to one. When the HS flag is one, the CPU uses the program supplied hash subkey in the H field; and the H field and HS flag are not altered in this case.

For the GCM-encrypted-AES functions, bytes 32-47 of the parameter block are reserved and should contain zeros; otherwise, the program may not operate compatibly in the future. In this case, the CPU computes the hash subkey by encrypting 128 bits of binary zeros using the deciphered cryptographic key (K); and the H field and HS flag are not altered in this case.

Total Additional Authenticated Data Length (TAADL) 408: Bytes 48-55 of the parameter block contain a 64-bit unsigned binary integer designating the total length in bits of the entire additional authenticated data for the message being processed.

Total Plaintext or Ciphertext Length (TPCL) 410: Bytes 56-63 of the parameter block contain a 64-bit unsigned binary integer designating the total length in bits of the entire plaintext or ciphertext for the message being processed.

Initial Counter Value ($J_0$) 412: Bytes 64-79 of the parameter block contain a 128-bit initial counter value that is used (a) to provide the leftmost 96 bits of the initial counter block used by the GCTR function, and (b) to encrypt the last authentication tag (T) field.

Cryptographic Key (K) 414: The cryptographic key used in the encipher and decipher operations begins at byte 80 of the parameter block. The size of the key field and its offset in the parameter block are dependent on the function code, as indicated below:

| Function Code | Function | Key Length (bytes) | Key Offset (bytes) |
| --- | --- | --- | --- |
| 18 | GCM-AES-128 | 16 | 80-95 |
| 19 | GCM-AES-192 | 24 | 80-103 |
| 20 | GCM-AES-256 | 32 | 80-111 |
| 26 | GCM-Encrypted-AES-128 | 16 | 80-95 |
| 27 | GCM-Encrypted-AES-192 | 24 | 80-103 |
| 28 | GCM-Encrypted-AES-256 | 32 | 80-111 |

AES Wrapping Key Verification Pattern ($WK_aVP$) 418: For the GCM-Encrypted-AES functions (codes 26-28), the 32 bytes immediately following the key in the parameter block contain the AES wrapping key verification pattern ($WK_aVP$).

For the GCM-AES functions (codes 18-20), the $WK_aVP$ field is not present in the parameter block.

In one embodiment, for the GCM-AES functions, the authentication of the additional authenticated data and the ciphering and authentication of the message includes a sequence of operations. The sequence of operations performed, which depends on the flags and function code in general register 0, include, for instance:

1. Wrapping Key Verification: This process is performed once for each execution of the instruction, and ensures that functions using encrypted wrapping keys are using the correct version of the key. For the GCM-encrypted-AES functions (function codes 26-28), the contents of the 32-byte $WK_aVP$ field are compared with the contents of an AES wrapping-key verification pattern register. If they mismatch, the first operand and parameter block locations remain unchanged, and the operation is completed by setting condition code, e.g., 1. If they match, the contents of the key field 414 of the parameter block are deciphered using an AES wrapping key to obtain the 128-bit cryptographic key, K 414, used by the function; however, the key field of the parameter block is unchanged. For the GCM-AES functions that do not use encrypted keys (codes 18-20), wrapping key verification is not performed.

2. Computing the Hash Subkey: This process takes a 128-bit value of zero, and ciphers it using a ciphering algorithm (e.g., AES encryption). For functions that do not use wrapped keys, implementation allows the program to specify a pre-computed hash subkey. A hash subkey is used in the GHASH processing to produce the resulting message authentication tag.

Figure 5A:
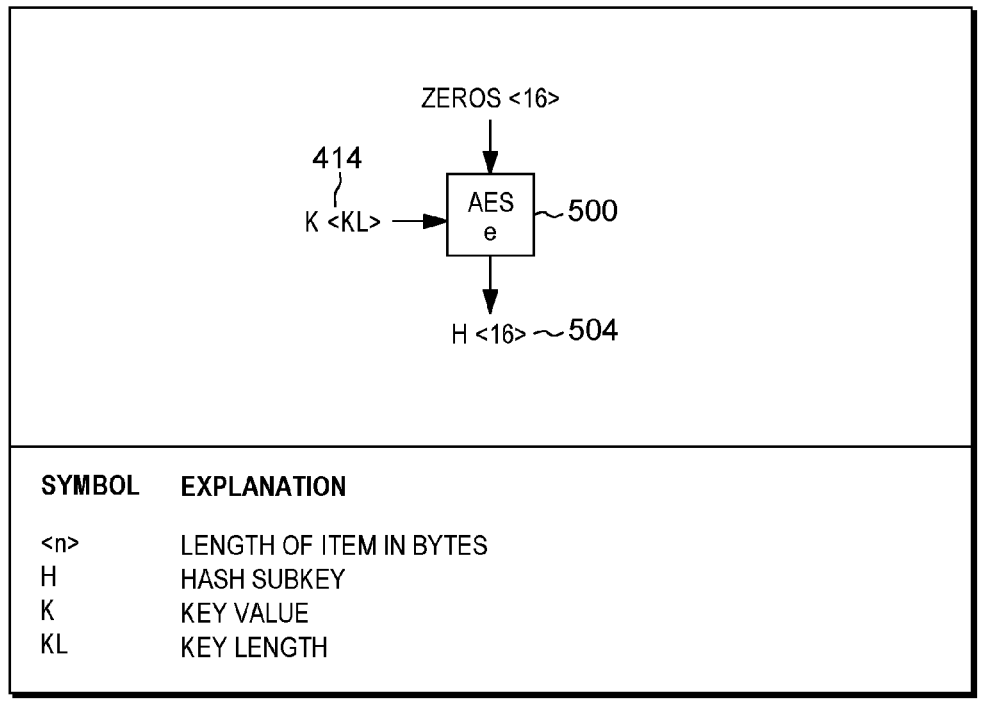
FIG. 5A depicts one example of encrypting a hash subkey, in accordance with an aspect of the present invention.

For GCM-AES functions (function codes 18-20), the following applies:

When the hash subkey supplied flag (HS, bit 53 of general register 0) is zero, a block of 128 binary zeros is encrypted using the AES algorithm. As shown in FIG. 5A, the AES algorithm 500 uses the key (K) field 414 from the parameter block. The resulting 128-bit hash subkey 504 is placed into H field 406 of the parameter block and the HS flag is set to one in general register 0.

When the HS flag is one, H field 406 in the parameter block is used as the hash subkey. In this case, the H field and HS flag are not altered.

For GCM-encrypted-AES functions (function codes 26-28), the HS flag is ignored. A block of 128 binary zeros is encrypted using the AES algorithm as shown in FIG. 5A, using the decrypted key (K). In this case, H field 406 of the parameter block and the HS flag are not altered.

3. Additional Authenticated Data Hashing: Any additional authenticated data is processed by the GHASH algorithm to form a partial message tag. When the third operand length in general register $R_3+1$ is nonzero, additional authenticated data hashing is performed. In this case, the even-numbered general register designated by the $R_3$ operand of the instruction contains the address of a storage location containing data from which a message authentication tag is computed using the GHASH algorithm. In addition to the blocks of the third operand, the GHASH function uses hash subkey 406 and tag field 404 in the parameter block as input values.

Figure 5B:
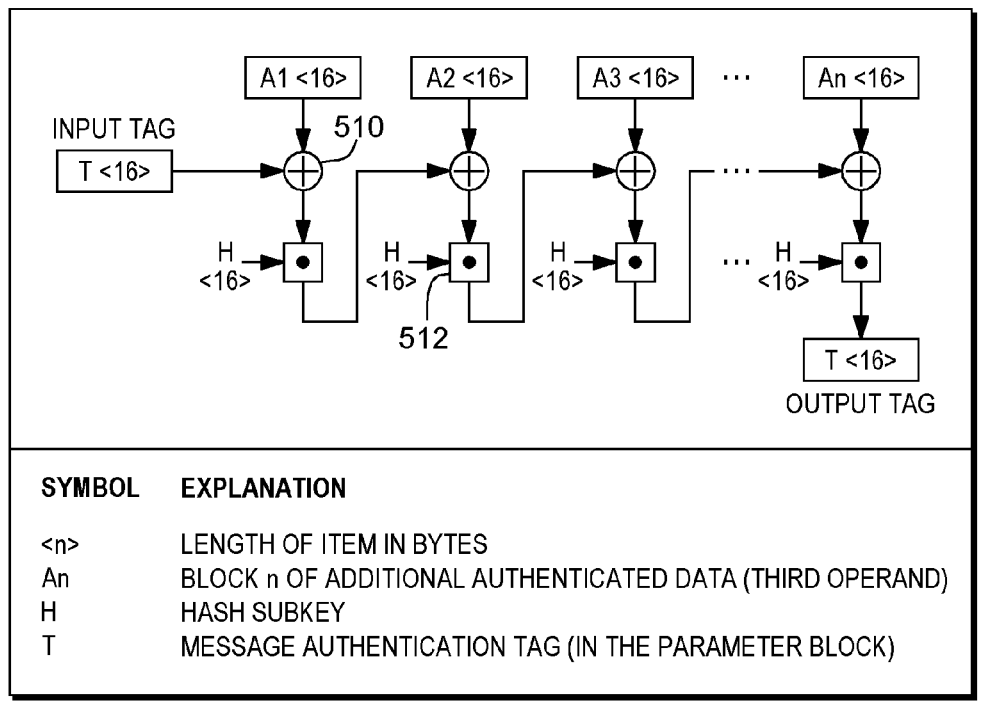
FIG. 5B depicts one example of Galois Hash processing of full blocks of additional authenticated data, in accordance with an aspect of the present invention.

The result is obtained as if processing starts at the left end of the third operand and proceeds to the right, block by block. When one or more full 16-byte blocks of additional authenticated data remain, the processing is as illustrated in FIG. 5B, in which the operation at 510 is a bitwise exclusive OR, and the operation at 512 is a GCM multiplication operation over GF $(2^{128})$.

In one implementation, the additional authenticated data hashing process ends when any of the following is true:

A CPU-determined number of blocks that is less than the length of the third operand has been processed. In this case, the message authentication computed thus far is placed into T field 404 of the parameter block, general register $R_3$ is incremented by the number of third operand bytes processed, general register $R_3+1$ is decremented by the same amount, and the instruction completes by setting, e.g., condition code 3.

The last additional authenticated data flag (LAAD, bit 54 of general register 0) is zero, and the number of bytes remaining in the third operand is less than 16. In this case, the message authentication tag computed thus far (if any) is placed into T field 404 of the parameter block, general register $R_3$ is incremented by the number of third operand bytes processed (if any), general register $R_3+1$ is decremented by the same amount, and the instruction completes by setting, e.g., condition code 2.

The LAAD flag is one, and the number of bytes remaining in the third operand is between 1 and 15. In this case, the following is performed:
A copy of the remaining short block is padded on the right with sufficient binary zeros to form a full block that is hashed using GHASH.
General register $R_3$ is incremented by the number of third operand bytes processed, and the third operand length in general register $R_3+1$ is set to zero.

Figure 5C:
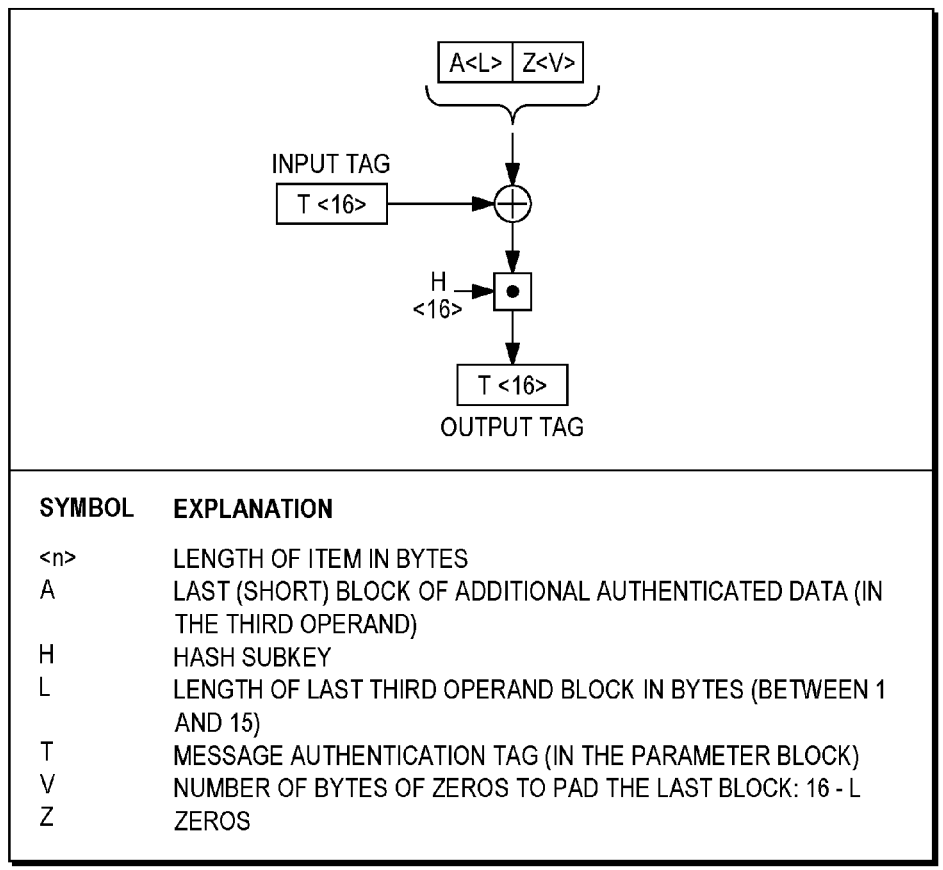
FIG. 5C depicts one example of Galois Hash processing of the last (short) block of additional authenticated data, in accordance with an aspect of the present invention.

Processing of the last block of the third operand is as illustrated in FIG. 5C.

The LAAD flag is one and the number of bytes remaining in the third operand is zero. In this case, it is model dependent whether the instruction completes with, e.g., condition code 3 or processing continues with the ciphering and hashing of the second operand, as described below.

When the third operand length in general register $R_3+1$ is initially zero and the LAAD flag is one, additional authenticated data hashing is not performed. In this case, it is model dependent whether T field 404 in the parameter block is fetched and stored back unmodified.

4. Ciphering and Hashing the Message: This is the process of encrypting or decrypting the message, and computing a message tag based on the encrypted data. Depending on the M bit (bit 56 of general register 0), each block of the second operand is either encrypted or decrypted using the GCTR function. The respective encrypted or decrypted result is placed at the first operand location, and the encrypted operand is hashed using the GHASH function. The combination of the GCTR and GHASH processing is described as the GCM function.

Figure 5D:
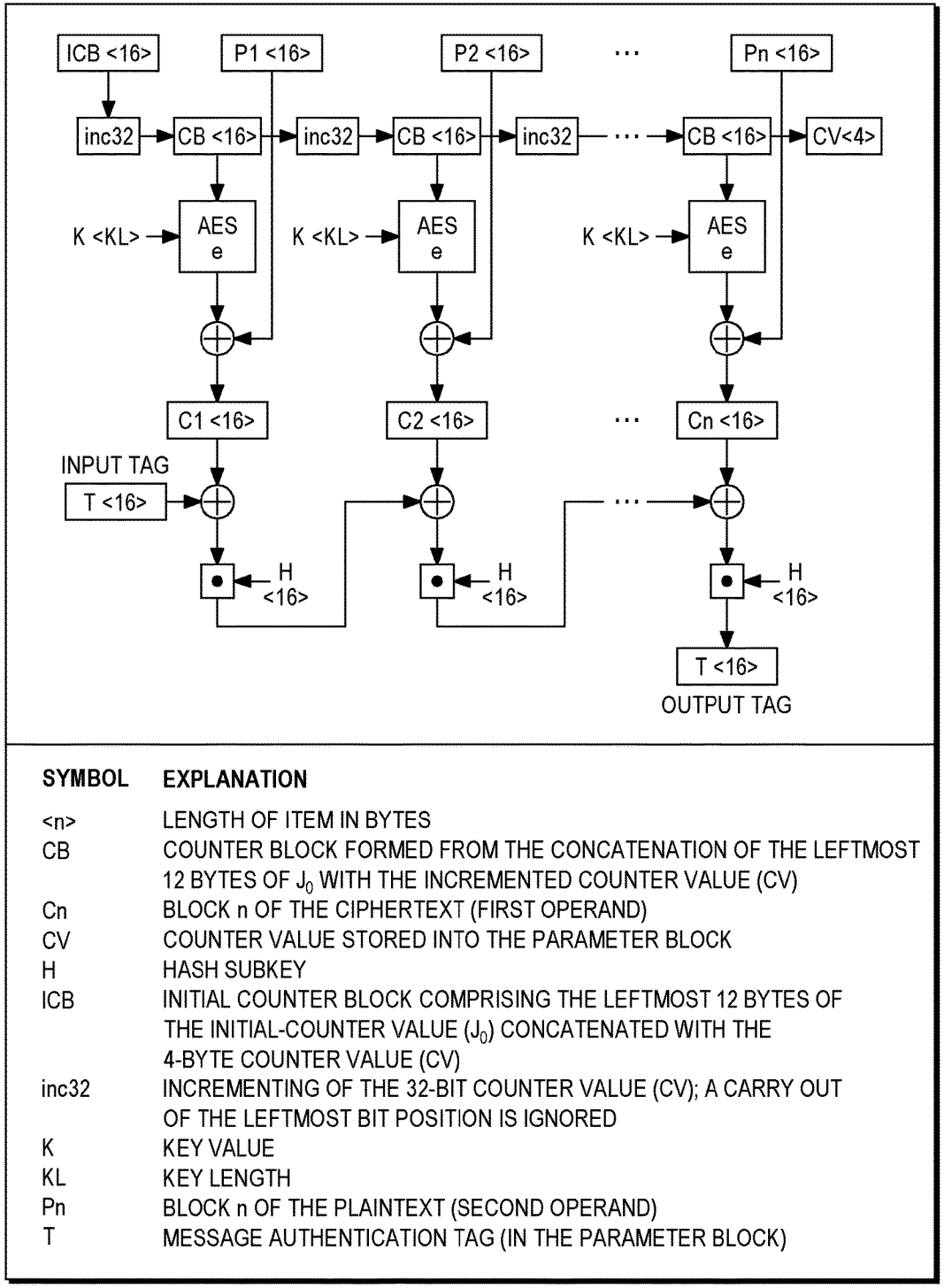
FIG. 5D depicts one example of combined ciphering and hashing of full blocks of a message for encryption, in accordance with an aspect of the present invention.
Figure 5E:
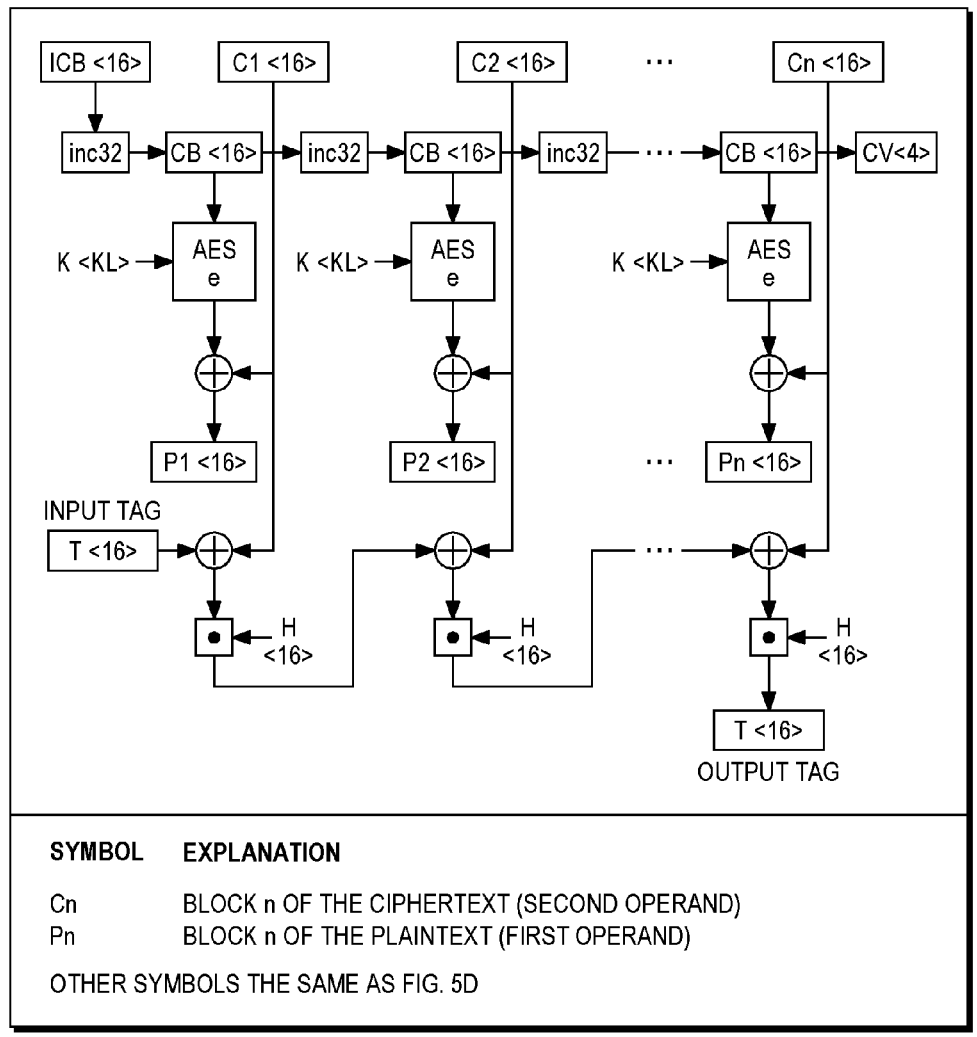
FIG. 5E depicts one example of combined ciphering and hashing of full blocks of a message for decryption, in accordance with an aspect of the present invention.

Conceptually, the result is obtained as if processing starts at the left end of the first and second operands and proceeds to the right, block by block, as illustrated in FIG. 5D and FIG. 5E. However, depending on the model, a unit of operation may process multiple blocks of the first and second operands in parallel; thus, the blocks may not necessarily be accessed in left-to-right order. Furthermore, multiple accesses may be made to a block, and in the case of the encryption operation, a first operand block may be re-fetched after it is stored.

The GCTR function uses a 16-byte initial counter block (ICB) formed from the concatenation of the leftmost 12 bytes of the initial counter value ($J_0$) 412 on the left with the four-byte counter (CV) 402 on the right. GCTR also uses the key field (either directly from the parameter block for the GCM-AES functions, or the decrypted key for the GCM-encrypted-AES functions). For each block that is ciphered by GCTR, the counter value (CV) is incremented by one; a carry out of bit position 0 of the counter value is ignored. The GCTR function then uses a 16-byte counter block (CB) formed from the leftmost 12 bytes of $J_0$ concatenated with the incremented counter value.

The GHASH function uses the encrypted data (that is, the encrypted first operand result when M is 0 or the second operand when M is one), the tag (T) field from either the parameter block or from the preceding step, and the hash subkey.

When the M bit is zero (that is, when the second operand is being encrypted), GCM processing of full blocks is as illustrated in FIG. 5D. When the M bit is one (that is, when the second operand is being decrypted), GCM processing of full blocks is as illustrated in FIG. 5E.

The ciphering and hashing process for either encryption or decryption continues until any of the following is true, in one example:

A CPU-determined number of blocks that is less than the length of the second operand has been processed. In this case, the current counter value is placed into CV field 402 of the parameter block, the message authentication tag computed thus far is placed into T field 404 of the parameter block, general registers $R_1$ and $R_2$ are incremented by the number of second operand bytes processed, general register $R_2+1$ is decremented by the same amount, and the instruction completes by setting, e.g., condition code 3.

The last plaintext/ciphertext flag (LPC, bit 55 of general register 0) is zero, and the number of bytes remaining in the second operand is less than 16. In this case, the current counter value is placed into CV field 402 of the parameter block, the message authentication tag computed thus far (if any) is placed into T field 404 of the parameter block, general registers $R_1$ and $R_2$ are incremented by the number of second operand bytes processed (if any), general register $R_2+1$ is decremented by the same amount and the instruction completes by setting, e.g., condition code 2.

The LPC flag is one, and the number of bytes remaining in the second operand is between 1 and 15. In this case, the following is performed:
  A copy of the remaining bytes of the second operand is padded on the right with sufficient binary zeros to form a full block that is ciphered using the GCTR algorithm, and the leftmost bytes of the resulting encrypted or decrypted block are placed at the first operand location. The number of bytes placed at the first operand location is the same as the number of bytes remaining in the second operand (that is, less than 16).
  The GHASH algorithm is then applied to the cipher text. When M is zero, the input to the GHASH algorithm includes a copy of the short block stored into the first operand location, padded on the right with sufficient binary zeros to form a full block. When M is one, the input to the GHASH algorithm is the same as the input to the GCTR algorithm (that is, a copy of the remaining bytes of the second operand, padded on the right with sufficient binary zeros to form a full block).
  The current counter value is placed into CV field 402 of the parameter block, the resulting tag value is placed in the parameter block, general registers $R_1$ and $R_2$ are incremented by the number of second operand bytes processed, and general register $R_2+1$ is set to zero.

Figure 5F:
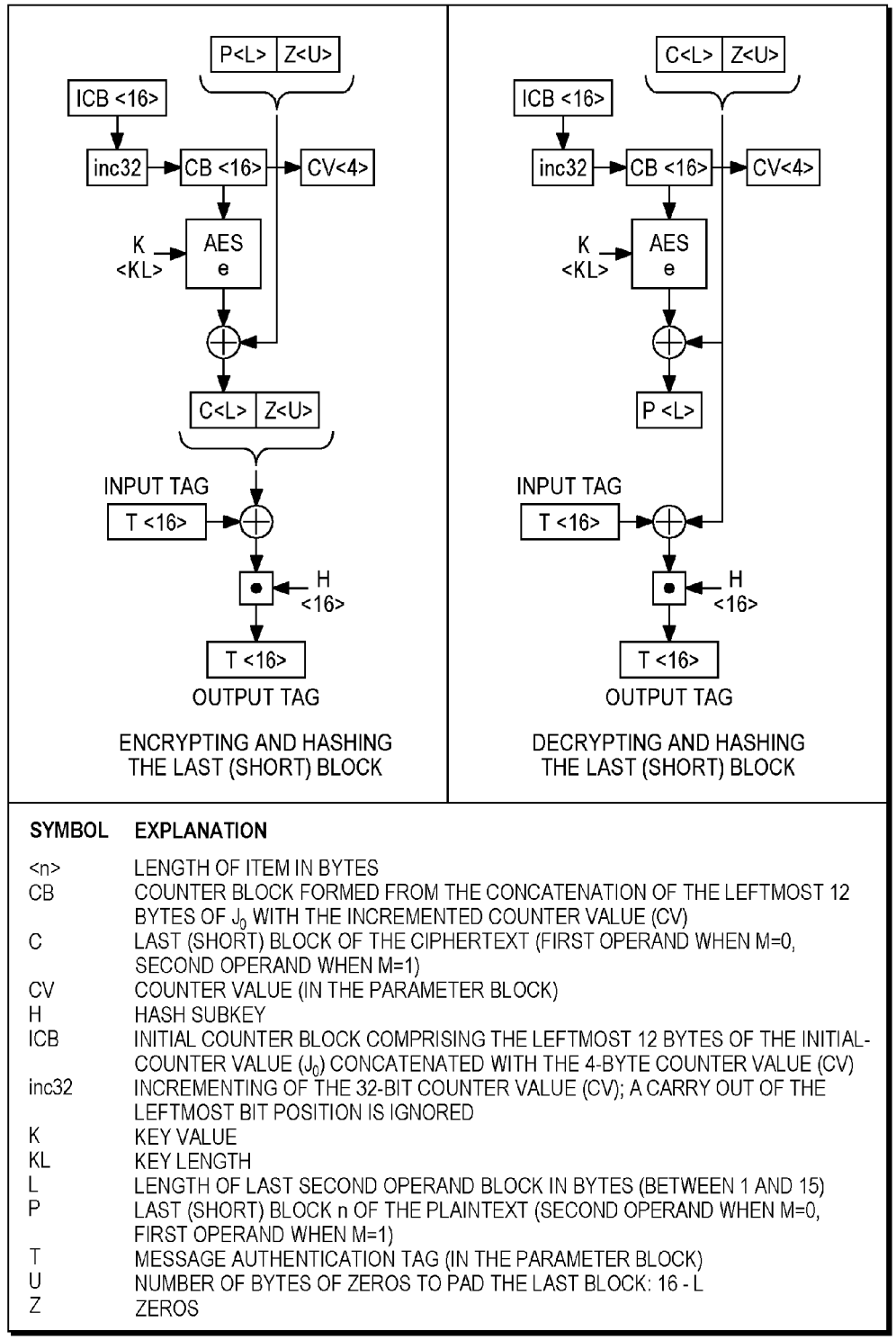
FIG. 5F depicts one example of ciphering and hashing of the last (short) block of a message, in accordance with an aspect of the present invention.

GCM processing of the last block of the second operand is as illustrated in FIG. 5F.

The LPC flag is one, and the number of bytes remaining in the second operand is zero. In this case, it is model dependent whether the instruction completes with, e.g., condition code 3, or continues processing with the last message authentication tag hashing and encryption, as described below.

5. Last Message Authentication Tag Hashing and Encryption: This process takes the total length of the additional authenticated data and message in bits, subjects this to the GHASH algorithm, and then merges it with an enciphered initial counter value to form the final message authentication tag. A 128-bit value comprising the concatenation of the 64-bit total additional authentication data length (TAADL) and total plaintext or ciphertext length (TPCL) fields from the parameter block is hashed using the GHASH function. The GHASH function uses the concatenated lengths field, the tag (T) field as computed in the ciphering and hashing operation, and the hash subkey.

Figure 5G:
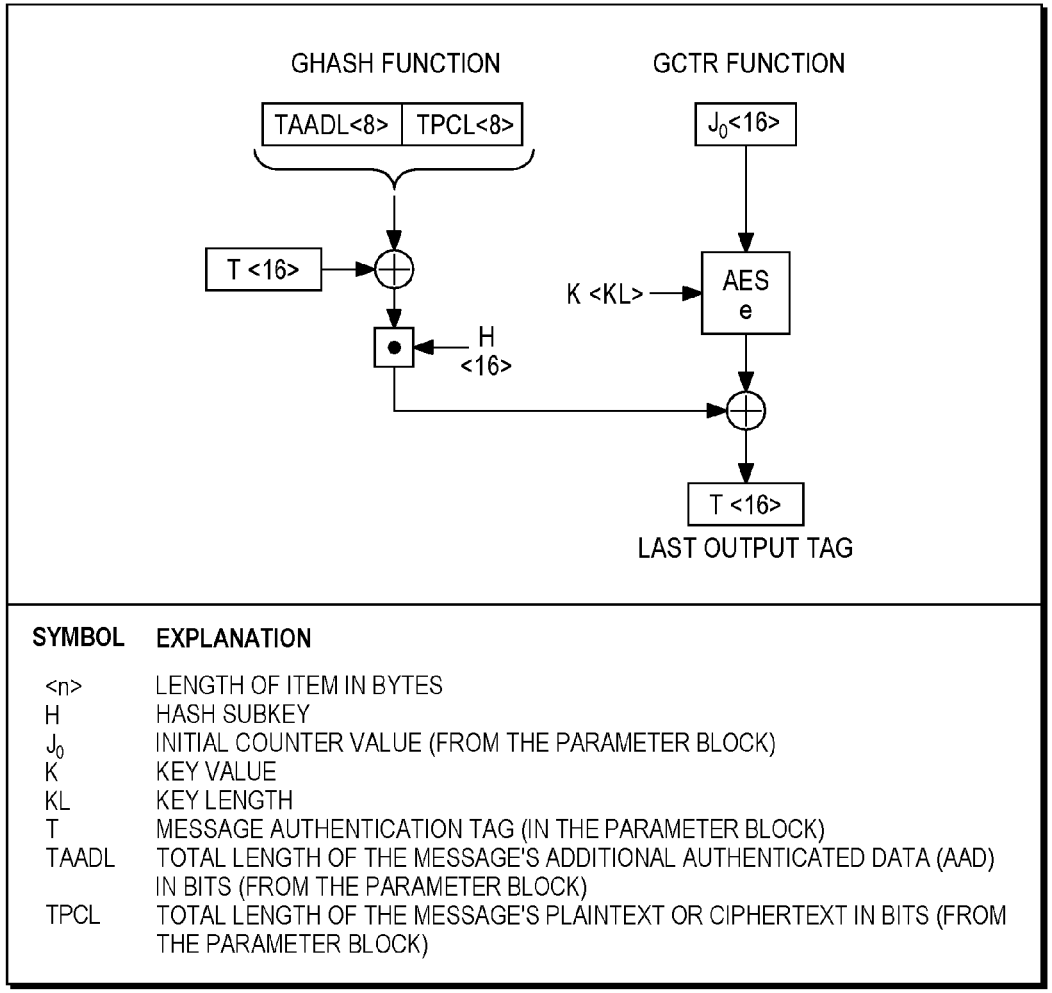
FIG. 5G depicts one example of hashing and encrypting of the last tag, in accordance with an aspect of the present invention.

The resulting 128-bit output of GHASH is then processed by the GCTR algorithm. Note, unlike the ciphering and hashing operation, the input counter to GCTR is initial counter block ($J_0$) field 412 from the parameter block. The resulting 128-bit value replaces tag (T) field 404 in the parameter block, and the instruction completes with, e.g., condition code 0. FIG. 5G illustrates one embodiment of the hashing and encryption of the last tag value.

In one embodiment, the program issuing the instruction is responsible for supplying accurate TAADL and TPCL values (e.g., in bits). In a further embodiment, the program may set the TAADL and TPCL values to zero when beginning the process of the message, and the CPU could update these fields as one or more repeated executions of the instruction process the message.

Additional details relating to the instruction are provided below.

The detection of conditions resulting in a partial completion (e.g., condition code 3) depends on the model, and may be a different number each time the instruction is executed. The CPU-determined number of blocks is usually nonzero. In certain unusual situations, this number may be zero, and condition code, e.g., 3 may be set with no progress. However, the CPU protects against endless reoccurrence of this no-progress case.

The results are unpredictable if either of the following is true:
  The third operand overlaps destructively with any portion of the parameter block that may be updated during additional authenticated data processing.
  The LAAD flag is one, and any of the following is true:
    The second operand overlaps destructively with any portion of the parameter block that may be updated during ciphering and hashing.
    The first operand overlaps destructively with any portion of the parameter block that may be accessed during ciphering and hashing.
    The first operand overlaps destructively with the second operand, but the operands do not designate the same location.

Operands are said to overlap destructively when a location would be used as a source after data would have been moved into it, assuming processing to be performed from left to right.

One example of various condition codes set by the instruction, and the resulting second- and third-operand lengths based on the LAAD and LPC flags are indicated below:

| CC | LAAD | LPC | 3$^{rd}$ OpL | 2$^{nd}$ OpL |
|---|---|---|---|---|
| 0 | 1 | 1 | 0 | 0 |
| 1 | — | — | Unchanged† | Unchanged† |
| 2 | 0 | — | <16 | Unchanged |
| 2 | 1 | 0 | 0 | <16 |
| 3 | 0 | — | >=16 | Unchanged |
| 3 | 1 | 0 | 0 | >=16 |
| 3 | 1‡ | 1‡ | 0‡ | 0‡ |

Explanation:
- Not applicable

† Also, first-, second-, and third-operand addresses in general registers R1, R2, and R3 are unchanged ‡ It is model dependent whether CC3 is set for these conditions (which are identical to the CC0 conditions).

CC Condition Code

LAAD Last additional authenticated data flag, bit 54 of general register 0

LPC Last plaintext/ciphertext flag, bit 55 of general register 0

$3^{rd}$ OpL Third Operand Length $2^{nd}$ OpL Second Operand Length

Store-type access exceptions may be recognized for any location in the parameter block, even though only the CV, T, and H fields are stored by the instruction.

A PER storage-alteration event may be recognized both for the first operand location and for the portion of the parameter block that is stored. A PER zero-address-detection event may be recognized for the first-, second-, and third-operand locations and for the parameter block (including the reserved field of the parameter block). When PER events are detected for one or more of these locations, it is unpredictable which location is identified in the PER access identification (PAID) and PER ASCE ID (AI).

It is unpredictable how many bytes of the first-, second-, or third-operand locations have been processed when a PER storage-alteration event is recognized for the parameter block. When a storage-alteration PER event is recognized for the first operand location, fewer than 4K additional bytes are stored into the first operand location before the event is reported.

When the third operand length is initially zero, the third operand is not accessed, and the third operand address and third operand length in general registers R3 and $R_3+1$, respectively, are not changed. When the second operand length is initially zero, the second operand is not accessed, and the second operand address and second operand length in general registers $R_2$ and $R_2+1$, respectively, are not changed. However, the parameter block may be accessed even when the second- and third-operand lengths are both zero.

When the contents of the $R_1$ and $R_2$, fields are the same, the contents of the designated registers are incremented by the number of bytes processed, not by a multiple of the number of bytes processed.

As observed by this CPU, other CPUs, and channel programs, references to the parameter block and storage operands may be multiple-access references, accesses to these storage locations are not necessarily block-concurrent, and the sequence of these accesses or references is undefined.

In certain unusual situations, instruction execution may complete by setting condition code 3 without updating the registers to reflect the last unit of the first, second, and third operands processed. The size of the unit processed in this case depends on the situation and the model, but is limited such that the portion of the first and second operands which have been processed and not reported do not overlap in storage; and the portion of the first and third operands which have been processed and not reported do not overlap in storage. In all cases, change bits are set and PER storage-alteration events are reported, when applicable, for all first-operand locations processed.

For functions that perform a comparison of the encrypted cryptographic key with the wrapping-key verification-pattern register, it is unpredictable whether access exceptions and PER zero-address-detection events are recognized for the first, second, and third operands when the comparison results in a mismatch and respective operand's length is nonzero.

Access exceptions may be reported for a larger portion of an operand than is processed in a single execution of the instruction; however, access exceptions are not recognized for locations beyond the length of an operand nor for locations more than 4K bytes beyond the current location being processed.

In one example, a specification exception is recognized and no other action is taken if any of the following occurs:
1. Bits 57-63 of general register 0 specify an unassigned or uninstalled function code.
2. The $R_1$, $R_2$, or $R_3$ field designates an odd-numbered register or general register 0.
3. The $R_3$ field designates the same register as either the $R_1$ or $R_2$ fields.
4. The function code is nonzero, and the LPC flag is one (indicating that the last blocks of plaintext or ciphertext are being processed), but the LAAD flag is zero (indicating that not all additional authenticated data has been processed).

Resulting Condition Code, as examples:
0 Normal completion
1 Verification-pattern mismatch
2 Incomplete processing (remaining third operand length is less than, e.g., 16 when the LAAD flag is zero, or remaining second operand length is less than, e.g., 16 when the LPC flag is zero)
3 Partial completion (model-dependent limit exceeded)

Example Program Exceptions include:
Access (fetch, operand 2, operand 3, parameter block fields; store, operand 1, counter value, hash subkey, tag)
Operation (if the message-security-assist extension 8 is not installed)
Specification
Transaction constraint Further, example exception/completion conditions for execution priority include:
1.-7. Exceptions with the same priority as the priority of program-interruption conditions for the general case.
8. Specification exception due to invalid function code or invalid register number.
9. Specification exception due to LPC flag being one when the LAAD flag is zero (applicable when the function code is nonzero).
10.A.1 Access exceptions for an access to the parameter block.
10.A.2. Condition code 1 due to verification-pattern mismatch.
10.B Access exceptions for an access to the first, second, or third operand.
11. Condition code 3 due to partial processing of the third operand.
12. Condition code 2 due to the remaining third operand length being less than, e.g., 16 when the LAAD flag is zero.
13. Condition code 3 due to partial processing of the second operand.
14. Condition code 2 due to remaining second operand length being less than, e.g., 16 when the LPC flag is zero.
15. Condition code 0 due to normal completion.

Further, in one or more embodiments, the following apply:

When processing an individual message, the program initially sets, in one example, the following fields in the parameter block and does not alter these fields until the instruction completes with condition code, e.g., 0; otherwise, the results will not conform to the GCM standard.

a. Counter Value (CV): The CV field is to be initialized with the rightmost 4 bytes of the initial counter value ($J_0$) field.
b. Tag (T): The tag field is to be initialized to zeros.
c. The Hash Subkey (H): For KMA-GCM-AES functions (codes 18-20), the following applies:
   When the HS flag is one, the program supplies a pre-computed hash subkey in the H field. The subkey comprises, e.g., 16 bytes of zeros, encrypted using the AES algorithm.
   When the HS flag is zero, the CPU encrypts, e.g., 16 bytes of zeros using the AES algorithm and key field in the parameter block, stores the results in the H field, and sets the HS flag to one.
   For KM-encrypted-AES functions (codes 26-28), the CPU calculates the hash subkey, and the H field and HS flags are not altered.
d. Initial Counter Value ($J_0$): The initial counter value is derived from an initialization vector (IV) provided by the program. If the program uses, for instance, a 96-bit IV, then it is to store the IV into the leftmost 12 bytes of the $J_0$ field, and store 00000001 hex in the rightmost bytes of the $J_0$ field. If the program uses an IV having a different length, then it is to supply, e.g., a 16-byte hashed value of the IV in the $J_0$ field using the GHASH algorithm.
e. Key Value (K) and Wrapping-Key Verification Pattern (WKaVP): For proper ciphering of an individual message, the key is to be the same for all executions of the instruction. For KM-encrypted-AES functions, the wrapping-key-verification-pattern field is to also remain unchanged.

When processing the last plaintext or ciphertext block(s) (that is, when the LPC flag is one), the total additional authenticated data length (TAADL) and total plain text/ciphertext-length (TPCL) fields in the parameter block are to contain the total length in bits of the respective additional authenticated data and plaintext or ciphertext for the entire message.

The program is responsible for comparing the hashed tag of a decrypted message with that of the message when it was encrypted to ensure authenticity of the message.

The LAAD and LPC flags provide the means by which a message can be ciphered and hashed when not all components of the message are available for a single execution of the instruction. For example, if the plaintext or ciphertext portion of a message spans multiple disk or tape records, and not all blocks of the message have been read into storage, the program can process the earlier blocks of the message by issuing the instruction with the LPC flag set to zero. When the final plaintext or ciphertext blocks of the message are available, the program can then complete the message ciphering by issuing the instruction with the LPC flag set to one.

When condition code 2 is set due to either or both the LAAD or LPC flag being zero, the general registers containing the operand addresses and lengths, and the parameter block are updated to indicate the progress thus far. However, unlike condition code 3 (where the program can simply branch back to the instruction to continue the operation), the program is responsible for updating the operand addresses and lengths, and the LAAD and LPC flags, if necessary, before branching back to the instruction. If the program simply branches back to the instruction in response to condition code 2, a nonproductive program loop will result, in one example.

When condition code 3 is set, the general registers containing the operand addresses and lengths, and the parameter block, are usually updated such that the program can simply branch back to the instruction to continue the operation Additional details regarding various of the Galois/Counter Mode functions are described below. These are just examples, and are described in the U.S. National Institute of Science and Technology (NIST) Special Publication 800-38D, Recommendation for Block Cipher Modes of Operation: Galois/Counter Mode (GCM) and GMAC. Variations may be made, and/or other functions relating to Galois/Counter Mode and/or other cipher modes may be used.

For an understanding of the below functions, the following symbols are described:

Variables:
A The additional authenticated data.
C The ciphertext.
H The hash subkey.
ICB The initial counter block.
IV The initialization vector.
K The block cipher key.
P The plaintext.
R The constant within the algorithm for the block multiplication operation.
T The authentication tag.
t The bit length of the authentication tag.

Operations and Functions:
$0^s$ The bit string that consists of s '0' bits.
$CIPH_K(X)$ The output of the forward cipher function of the block cipher under the key K applied to the block X.
$GCTR_K(ICB, X)$ The output of the GCTR function for a given block cipher with key K applied to the bit string X with an initial counter block ICB.
$GHASH_H(X)$ The output of the GHASH function under the hash subkey H applied to the bit string X.
$inc_s(X)$ The output of incrementing the rightmost s bits of the bit string X, regarded as the binary representation of an integer, by 1 modulo $2^2$.
int(X) The integer for which the bit string X is a binary representation.
len(X) The bit length of the bit string X.
$LSB_s(X)$ The bit string consisting of the s rightmost bits of the bit string X.
$MSB_s(X)$ The bit string consisting of the s leftmost bits of the bit string X.
$\lceil x \rceil$ The least integer that is not less than the real number x.
$[x]_s$ The binary representation of the non-negative integer x as a string of s bits, where $x<2^s$.
X>>>1 The bit string that results from discarding the rightmost bit of the bit string X and prepending a '0' bit on the left.
X||Y The concatenation of two bit strings X and Y.
X⊕Y The bitwise exclusive-OR of two bit strings X and Y of the same length.
X·Y The product of two blocks, X and Y, regarded as elements of a certain binary Galois field.
$X^i$ For a positive integer i, the ith power of X under the product '·'
x·y The product of two integers, x and y.

One example of multiplication of blocks (X·Y) includes, for instance:
Prerequisites:
Let $R=11100001 \| 0^{120}$.
Input:
Blocks X, Y.

Output:

Block X·Y

Steps:

1. Let $X_0X_1 \ldots X_{127}$ denote the sequence of bits in X.
2. Let $Z_0=0^{128}$ and $V_0=Y$.
3. For i=0 to 127, calculate blocks $Z_{i+1}$ and $V_{i+1}$ as follows:

$Z_{i+1}=Z_i$ [if $x_i=0$, or]
   $Z_i \oplus V_i$ [if $x_i=1$]
   $V_{i+1}=V_i>>1$ [if $LSB_i(V_i)=0$, or]
   $(V_i>>1) \oplus R$ [if $LSB_i(V_i)=1$]

4. Return $Z_{128}$.

Further details regarding one example of a GCM encipher function are provided below:

Algorithm: $GCM\text{-}AE_x(IV, P, A)$

Prerequisites:

Approved block cipher CIPH with a 128-bit block size;
Key K;
Definitions of supported input-output lengths;
Supported tag length t associated with the key.

Input:

Initialization vector IV (whose length is supported);
Plaintext P (whose length is supported);
Additional authenticated data A (whose length is supported).

Output:

Ciphertext C;
Authentication tag T.

Steps:

1. Let $H=CIPH_K(0^{128})$.
2. Define a block, $J_0$, as follows:

if len(IV)=96, then let $J_0=IV\|0^{31}\|1$.
   if len(IV)≠96, then let $s=128 \cdot \lceil len(IV/128) \rceil - len(IV)$, and
   let $J_0=GHASH_H(IV\|0^{s+64}\|[len(IV)]_{64})$.

3. Let $C=GCTR_K(inc_{32}(J_0),P)$.
4. Let $u=128 \cdot \lceil len(C)/128 \rceil - len(C)$, and
   Let $v=128 \cdot \lceil len(A)/128 \rceil - len(A)$
5. Define a block, S, as follows:
   $S=GHASH_H(A\|0^v\|C\|0^u\|[len(A)]_{64}\|[len(C)]_{64})$.
6. Let $T=MSB_t(GCTR_K(J_0, S))$.
7. Return (C, T).

One embodiment of a GCM decipher function is described below:

Algorithm: $GCM\text{-}AD_K(IV, C, A, T)$

Prerequisites:

Same as above for encipher

Input:

Initialization vector IV;
Ciphertext C;
Additional authenticated data A;
Authentication tag T.

Output:

Plaintext P or indication of inauthenticity FAIL.

Steps:

1. If the bit length of IV, A, or C are not supported, or if len(T)≠t, then return FAIL.
2. Let $H=CIPH_K(0^{128})$.
3. Define a block, $J_0$, as follows:

If len(IV)=96, then let $J_0=IV\|0^{31}\|1$.
   if len(IV)≠96, then let $s=128 \cdot \lceil len(IV/128) \rceil - len(IV)$, and
   let $J_0=GHASH_H(IV\|0^{s+64}\|[len(IV)]_{64})$.

4. Let $P=GCTR_K(inc_{32}(J_0), C)$.
5. Let $u=128 \cdot \lceil len(C)/128 \rceil - len(C)$, and Let $v=128 \cdot \lceil len(A)/128 \rceil - len(A)$ 6. Define a block, S, as follows:
   $S=GHASH_H(A\|0^v\|C\|0^u\|[len(A)]_{64}\|[len(C)]_{64})$.
7. Let $T'=MSB_t(GCTR_K(J_0, S))$.
8. If T=T', then return P, else return FAIL.

One embodiment of the Galois Hash (GHASH) function is described below:

Algorithm: $GHASH_H(X)$

Prerequisites

Block H, the hash subkey.

Input:

Bit string X such that len(X)=128m for some positive integer m.

Output:

Block $GHASH_H(X)$.

Steps:

1. Let $X_1, X_2, \ldots, X_{m-1}, X_m$ denote the unique sequence of blocks such that $X=X_1\|X_2\| \ldots \|X_{m-1}\|X_m$.
2. Let $Y_0$ be the "zero block," $0^{128}$ (i.e., 128 bits of zeros).
3. For i=1, m, let $Y_i=(Y_{i-1} \oplus X_i) \cdot H$.
4. Return $Y_m$.

Further, one embodiment of a Galois Counter (GCTR) function is described below:

Algorithm: $GCTR_K(ICB, X)$

Prerequisites:

Approved block cipher CIPH with a 128-bit block size;
Key K.

Input:

Initial counter block ICB.
Bit string X, of arbitrary length.

Output:

Bit string Y of bit length len(X).

Steps:

1. If X is the empty string, then return the empty string as Y.
2. Let $n=\lceil len(X)/128 \rceil$.
3. Let $X_1, X_2, \ldots, X_{n-1}, X_n^*$ denote the unique sequence of bit strings such that
   $X=X_1\|X_2\| \ldots \|X_{n-1}\|X_n^*$;
   $X_1, X_2, \ldots, X_{n-1}$ are complete blocks.
4. Let $CB_1=ICB$.
5. For i=2 to n, let $CB_i=inc_{32}(CB_{i-1})$.
6. For i=1 to n-1, let $Y_i=X_i \oplus CIPH_K(CB_i)$. [for all full blocks except last]
7. Let $Y_n^*=X_n^* \oplus MSB_{len(Xn^*)}/(CIPH_K(CB_n))$. [for final full or partial block]
8. Let $Y=Y_1\|Y_2\| \ldots \|Y_n^*$.
9. Return Y.

Figure 6:
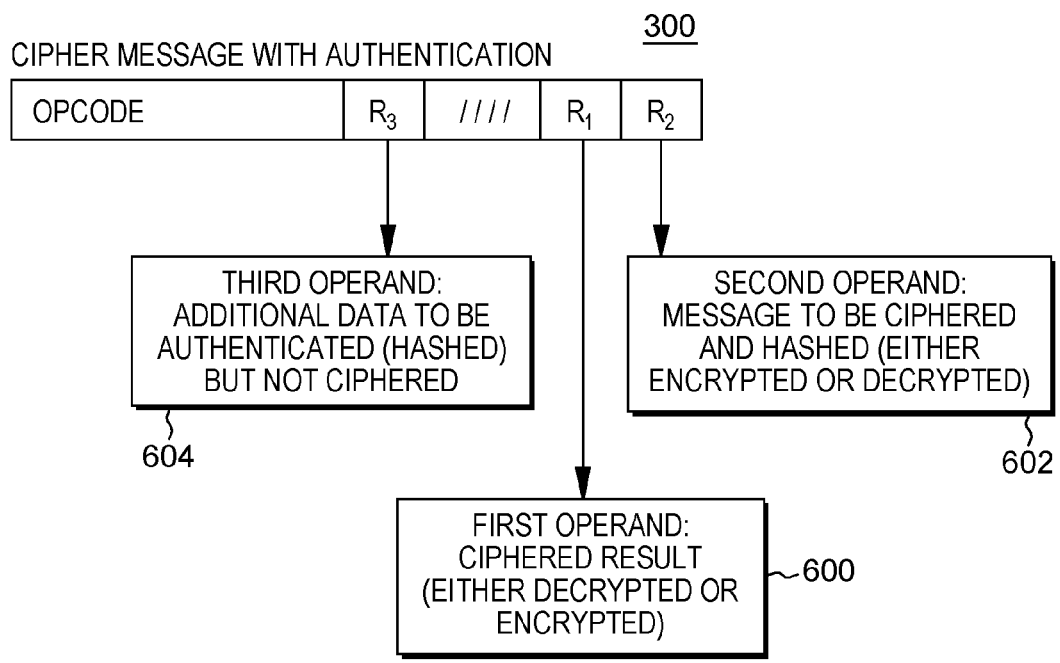
FIG. 6 depicts one example of selected processing associated with the Cipher Message with Authentication instruction, in accordance with an aspect of the present invention.

A pictorial depiction of the Cipher Message With Authentication instruction is shown in FIG. 6. As shown, Cipher Message With Authentication instruction 300 includes a first operand 600 that includes the ciphered result (either encrypted or decrypted); a second operand 602 that includes a message to be ciphered (either encrypted or decrypted) and hashed; and a third operand 604 that includes additional data to be authenticated (hashed), but not ciphered.

Further details regarding processing associated with one embodiment of the Cipher Message With Authentication instruction are described with reference to FIGS. 7A-7E.

Figure 7A:
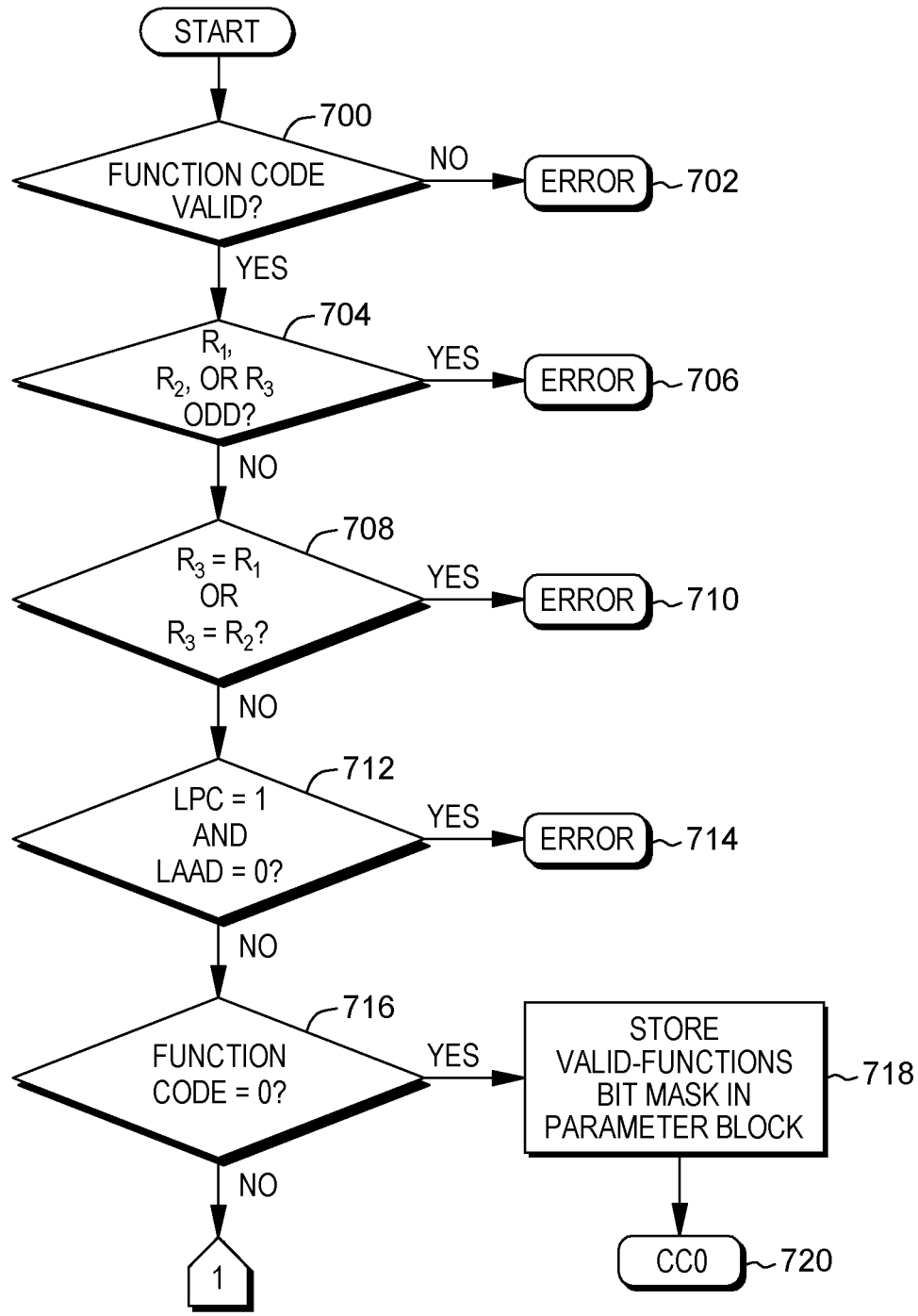
FIGS. 7A-7E depict one example of processing associated with the Cipher Message with Authentication instruction, in accordance with an aspect of the present invention.

Referring to FIG. 7A, initially, a determination is made as to whether the function code included in general register 0 used by the instruction is valid, INQUIRY 700. If it is not valid, then an error may be provided, STEP 702, and processing of the instruction is complete. Otherwise, if the function code is valid, then a further determination is made as to whether the register specified in the first, second or third register fields (i.e., $R_1$, $R_2$, $R_3$) is an odd numbered register, INQUIRY 704. If one of those registers is an odd numbered register, then in one example, an error is provided, STEP 706, and processing is complete. Otherwise, a further determination is made as to whether the register specified in the $R_3$ field is equal to the register specified in the $R_1$ field, or whether the register specified in the $R_3$ field is equal to the register specified in the $R_2$ field, INQUIRY 708. If the register specified in $R_1$ or $R_2$ is equal to the register specified in $R_3$, then an error may be specified in one example, STEP 710, and processing is complete. Otherwise, a further check is made as to whether the last plaintext/ciphertext flag is equal to a specified value, such as one, and whether the last additional authenticated data flag is set to a selected value, such as zero. If both of those are true, then an error may be provided, STEP 714, and processing of the instruction is complete. Otherwise, if the last plaintext/ciphertext control is not equal to one, and the last additional authenticated data control is not equal to zero, then a check is made as to whether the function code is equal to zero, INQUIRY 716. If the function code is zero, then a query function is being performed and the valid functions are stored in the parameter block, STEP 718. A condition code of, e.g., zero, is set, in one example, STEP 720. However, if the function code is not zero, then processing continues with generation of the hash subkey, as described with references to FIG. 7B.

Figure 7B:
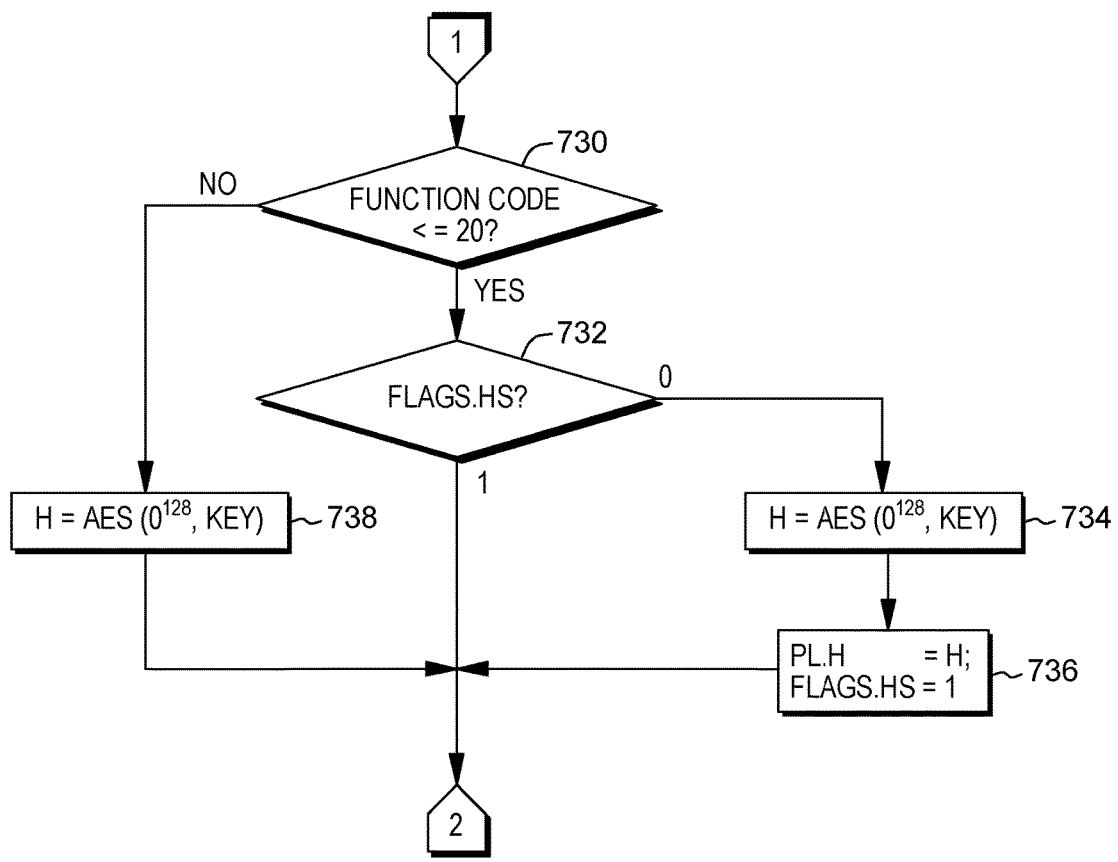

Referring to FIG. 7B, for ciphering functions that do not use encrypted keys, the program may either supply its own hash subkey in the parameter block, or have the instruction generate a hash subkey. For ciphering functions that use encrypted keys, the instruction generates a hash subkey, and any program-supplied hash subkey is ignored. Thus, in one embodiment, a determination is made as to whether the function code designates an unencrypted-key function (that is, is the function code less than or equal to a specified value, such as 20), INQUIRY 730. If the function code designates an unencrypted-key function (i.e., the function code is less than or equal to, e.g., 20), then a determination is made as to whether the program has supplied a hash subkey, INQUIRY 732. If the program has not supplied a hash subkey (e.g., the HS control is zero), then the hash subkey is generated, STEP 734. For instance, $H=AES(0^{128}, Key)$. Further, the hash tag is stored in the parameter block (PL.H), and the hash subkey supplied control (HS) is set to one, STEP 736. (PL in the description and figures refers to the parameter block.)

Returning to INQUIRY 732, if the program has supplied a hash subkey (e.g., the HS control is one), processing continues with hashing the additional authenticated data, as described with reference to FIG. 7C.

Figure 7C:
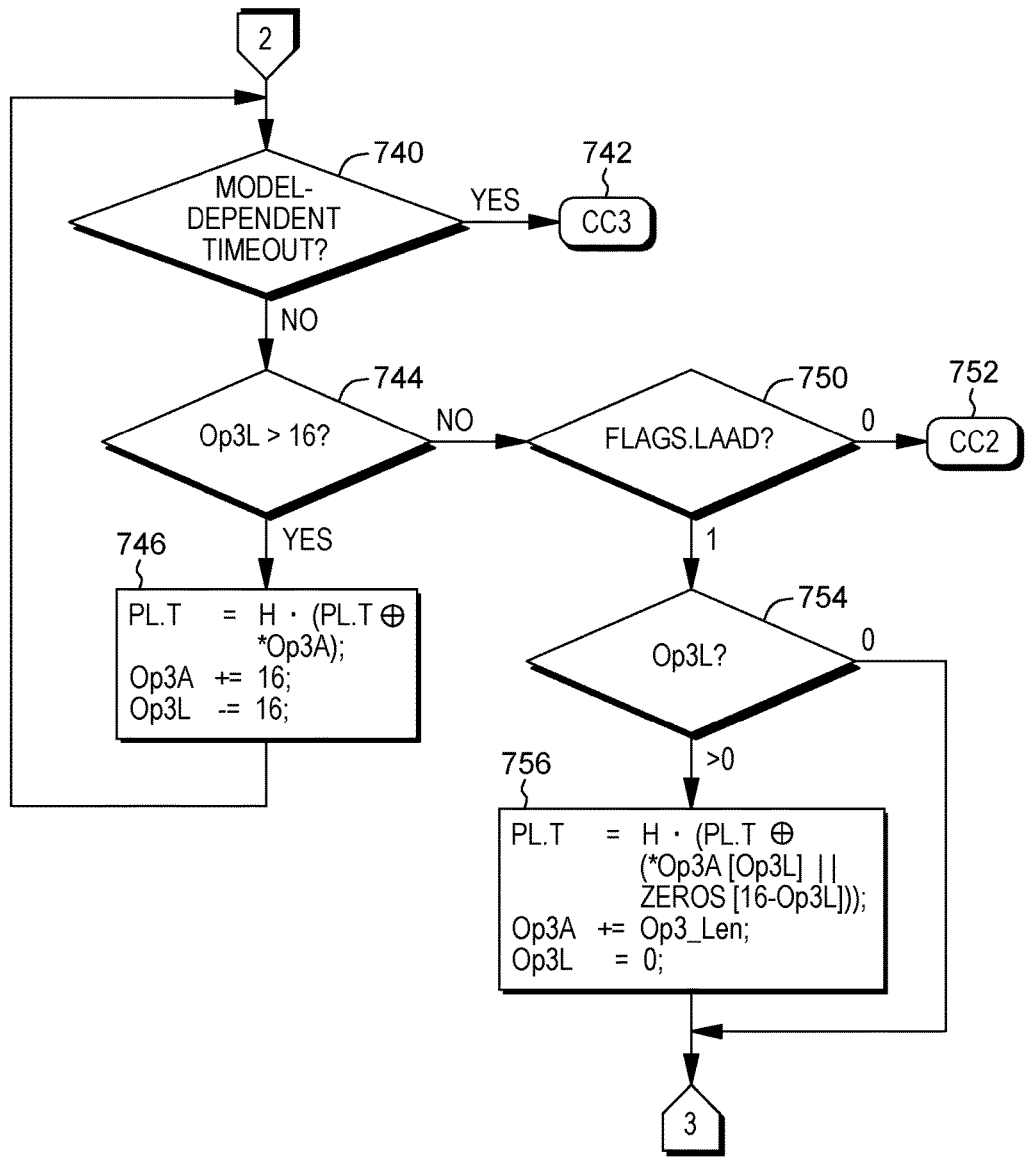

Returning to INQUIRY 730, if the function code designates a function that uses encrypted keys (e.g., the function code is greater than 20), then the function is a wrapping key function and H is computed (e.g., $H=AES(0^{128}, Key)$, STEP 738, but not saved, and processing continues with hashing the additional authenticated data, as described with references to FIG. 7C.

Referring to FIG. 7C, in one embodiment, a determination is made as to whether there has been a model-dependent timeout, INQUIRY 740. If there has been a model-dependent timeout, then processing terminates with a condition code of, e.g., 3, in one example, STEP 742. However, if a model-dependent timeout has not occurred, then a determination is made as to whether the length of operand 3 (Op3L) is greater than a specified value, such as 16, INQUIRY 744. If it is greater than 16, then a full additional authentication data block is available for processing, STEP 746. For example, tag 404 in the parameter block (PL.T) is set to H·(PL.T⊕*Op3A), in which * indicates Op3A is a pointer to the third operand (Op3A) (i.e., the tag field (T) in the parameter block is XORed with whatever storage the general register designated by $R_3$ points to); 16 bytes, as an example, is added to the address of operand 3 (Op3A); and 16 bytes, as an example, is subtracted from the length of operand 3 (Op3L). Op3L is, e.g., the length of operand 3 in bytes. Processing then continues with INQUIRY 740.

Returning to INQUIRY 744, if the length of operand 3 is not greater than the specified value, e.g., 16, then a determination is made of the last additional authenticated data control of the flags field, INQUIRY 750. If the value of the control is zero, then in one embodiment, a condition code, such as condition code 2, is set, STEP 752. This indicates that there is additional authenticated data to be processed.

Returning to INQUIRY 750, if the control is one, then a further check is made of the length of operand 3 (Op3L), INQUIRY 754. If the length is greater than zero, then tag 404 of the parameter block is set, e.g., PL.T=H·(PL.T⊕(*Op3A[Op3L] zeros[16−Op3L])); the address of operand 3 is incremented by the length of operand 3; and the length of operand 3 is set equal to zero, STEP 756. Processing then continues with plaintext/ciphertext processing, as described with reference to FIG. 7D. Further, if the length of operand 3 is zero, INQUIRY 754, then processing continues with the plaintext/ciphertext processing of FIG. 7D.

Figure 7D:
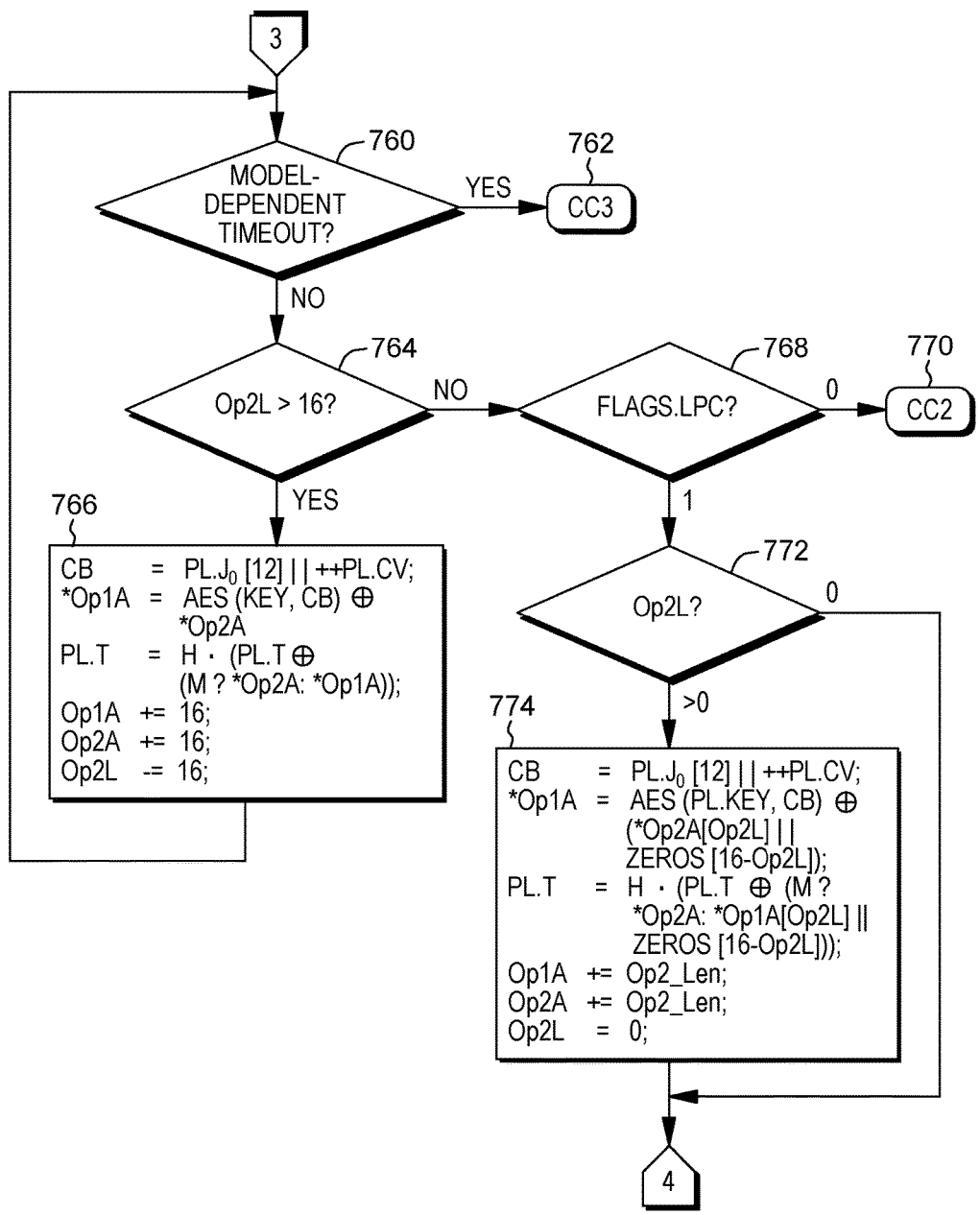

Referring to FIG. 7D, a determination is made as to whether there has been a model-dependent timeout, INQUIRY 760. If there has been a model-dependent timeout, then processing is complete with a condition code of e.g., 3, STEP 762. Otherwise, a determination is made as to whether the length of operand 2 (Op2L) is greater than a specified value, such as 16, INQUIRY 764. If it is, then CB=PL.$J_0$[12]||++PL.CV, in which ++ indicates increment— the counter value in the parameter block is incremented; and *Op1A=AES(Key,CB)⊕*Op2A; PL.T=H·(PL.T⊕(M?*Op2A: *Op1A)), STEP 766. (In one example, the text (M?*Op2A: *Op1A) indicates that a determination is made as to whether M is true or false (1 or 0). If true, then *Op2A is used as the pointer to the input ciphertext in the second operand. If false, then *Op1A is the pointer to the output ciphertext in the first operand.) Further, the address of operand 1 (Op1A) is incremented by, e.g., 16 bytes, the address of operand 2 (Op2A) is incremented by, e.g., 16 bytes, and the length of operand 2 (Op2L) is decremented by, e.g., 16 bytes, STEP 766. Processing then proceeds to INQUIRY 760.

Returning to INQUIRY 764, if the length of operand 2 is not greater than the specified value, e.g., 16, then a check is made of the last plaintext/ciphertext control of the flags field, INQUIRY 768. If the flag is equal to zero, then a specified condition code, e.g., condition code 2, is set, STEP 770. This indicates that there is more plaintext/ciphertext to be processed. However, if the last plaintext/ciphertext control is set to one, then a further determination is made as to the length of operand 2, INQUIRY 772. If the length is greater than zero, then CB=PL.$J_0$[12]||++PL.CV; and *Op1A=AES(PL.Key, CB)⊕(*Op2A[Op2L]||zeros[16−Op2L); PL.T=H·(PL.T⊕(M?*Op2A: *Op1A[Op2L] zeros[16=Op2L])), STEP 774. Additionally, the addresses of operand 1 and operand 2 are increased by the length of operand 2, and the length of operand 2 is then set to zero, STEP 774. Thereafter, or if the length of operand 2 is zero, INQUIRY 772, then processing continues with final tag processing, as described with reference to FIG. 7E.

Figure 7E:
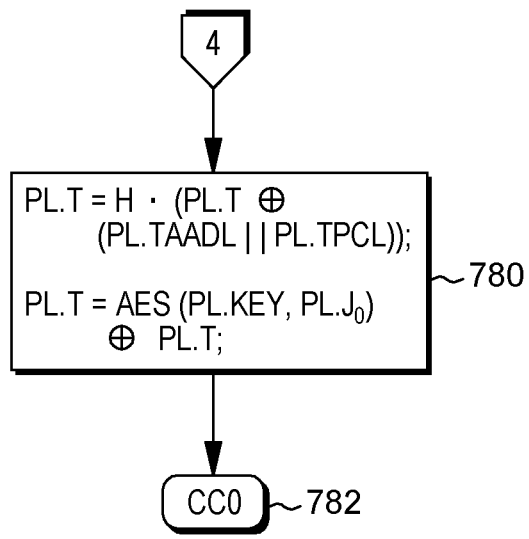

Referring to FIG. 7E, the tag is set equal to H·(PL.T (PL.TAADL||PL.TPCL), in which a hash function (e.g., GHASH) is performed on the full additional authenticated data bit length and full ciphertext bit length. Then, the tag is set equal to AES(PL.Key, PL.$J_0$)⊕PL.T, in which the final hash value is exclusively OR'd with the initial encrypted counter ($J_0$) to form the tag result, STEP 780. (That is, the previously computed tag is XORed with the concatenation of the two bit-length fields, and GHASHed. Then, the $J_0$ field is encrypted, and XORed with the results of the above computation to form the final tag.) Processing is then complete and a condition code of, e.g., 0, is set, STEP 782.

Described herein is a capability that combines hashing and ciphering in a single instruction (e.g., a single architected machine instruction) that further includes controls to ensure that an interruptible instruction can be properly re-executed to continue processing a message. One reason for re-execution is described below.

In one implementation, the ciphering instructions, defined by the z/Architecture, define the length of a message using a 64-bit register; thus, the length of a message can be up to 18,446,744,073,709,551,616 (16E) bytes. The GCM specification restricts the length of a message to 68,719,476,736 (64G) bytes; that is, the maximum value of a 32-bit counter times the size of a 128-bit (16-byte) message block. However, in order to prevent exceedingly long-running instructions, the processing of any individual ciphering instruction is limited to a much smaller amount—usually 4,096 bytes at a maximum. When a ciphering instruction completes, it updates the registers specifying the address and length of the message operands based on the number of bytes processed. If the instruction only partially processes the message, it completes by setting an indicative condition code (e.g., CC3). If the instruction completely processes the message, it completes by setting an alternate indicative condition code (e.g., CC0).

As described herein, the Cipher Message with Authentication instruction can accommodate a very large message, but only process a portion of the message in a single execution. The Cipher Message with Authentication instruction distinguishes its progress in additional authenticated data hashing and message ciphering and hashing based on, e.g., the combination of two program specified controls and the remaining lengths of the operands containing the additional authenticated data and message:

The last additional authentication data (LAAD) control indicates whether the program has supplied the entire additional authenticated data operand.

The last plaintext/ciphertext (LPC) flag indicates whether the program has supplied the entire message text to be ciphered and authenticated.

Based on the combination of the LAAD and LPC controls, along with the values in general registers designating the length of the respective operands, the instruction is able to perform some checks on the input, and reject inconsistent controls.

By combining the hashing and ciphering in a single instruction, separate instruction execution to hash additional authenticated data is avoided; multiple fetches of the message operand for hash and ciphering are avoided; and the combined operation can be efficiently performed by the hardware co-processor. By using a single instruction, the program does not have to separately issue instructions to encrypt zeros to form the hash subkey, hash the TAADL and TPCL, and encrypt and hash the final tag using $J_0$ as the counter.

Figure 8A:
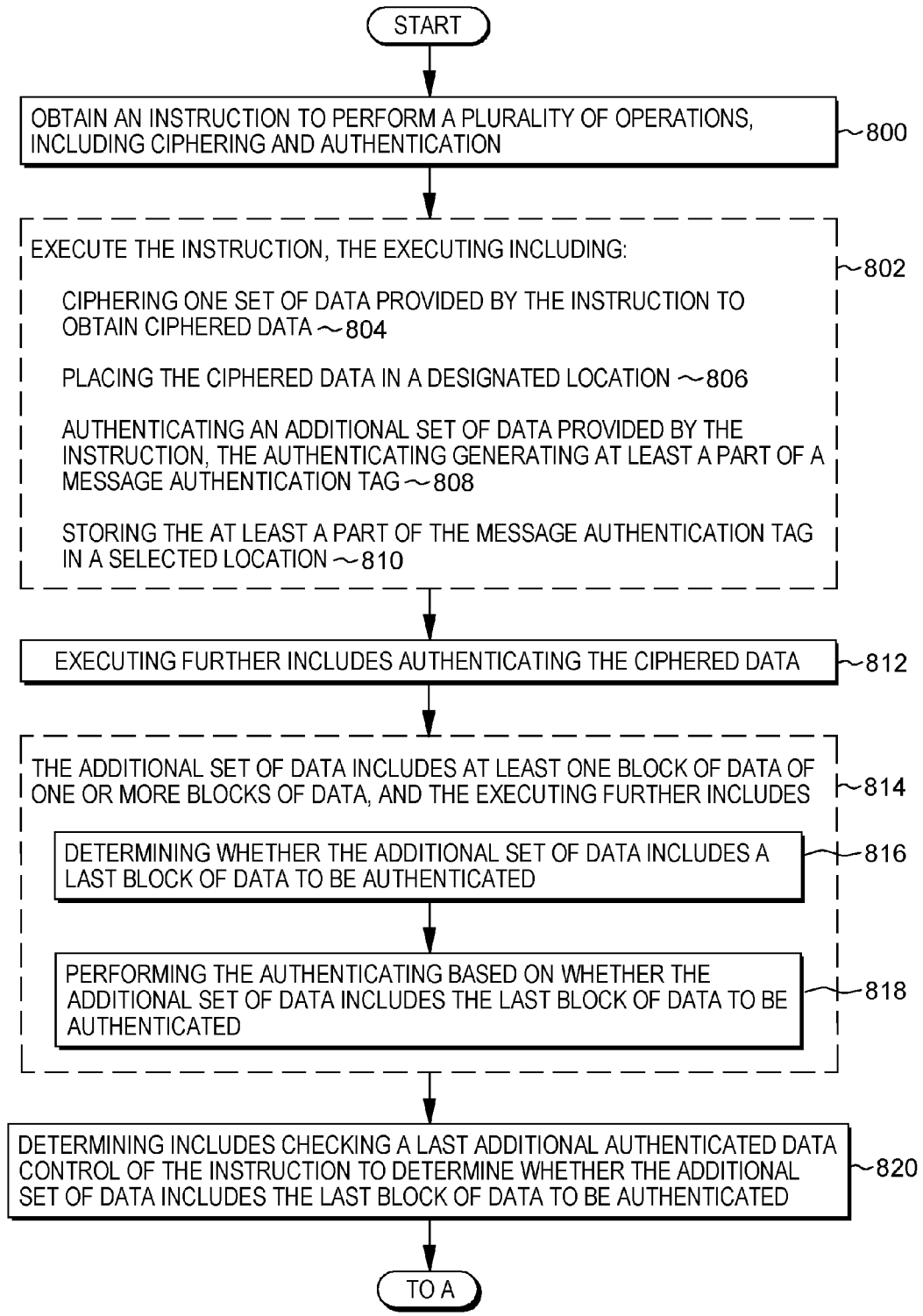
FIGS. 8A-8B depict one example of facilitating processing in a computing environment, which includes executing an instruction configured to perform a cipher message with additional authentication operation, in accordance with an aspect of the present invention.
Figure 8B:
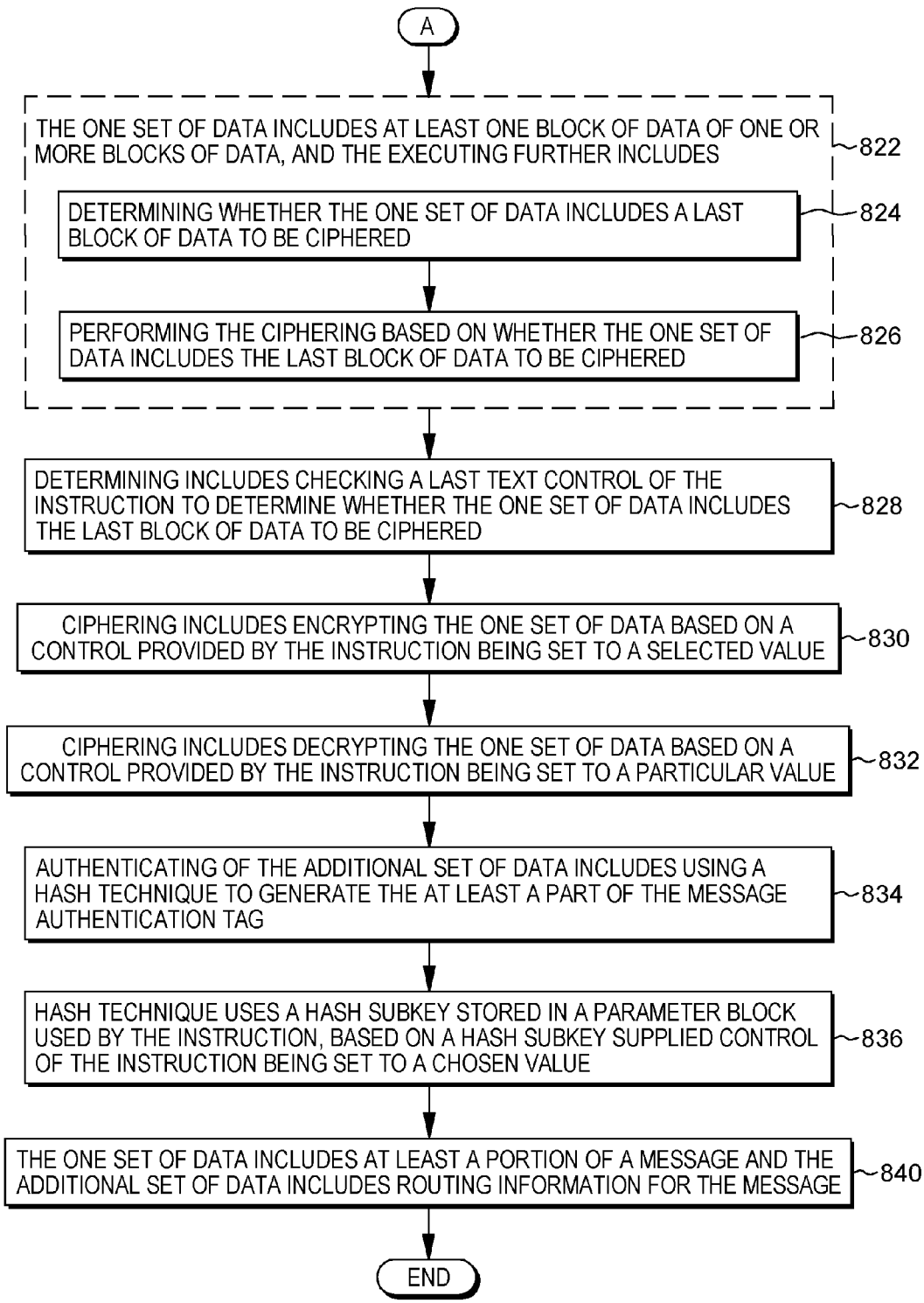

One embodiment of facilitating processing in a computing environment, which includes execution of a Cipher Message With Authentication instruction, is described with references to FIGS. 8A-8B.

Referring to FIG. 8A, in one embodiment, an instruction to perform a plurality of operations, including ciphering and authentication, is obtained, STEP 800, and the instruction is executed, STEP 802. The executing includes, for instance, ciphering one set of data provided by the instruction to obtain ciphered data, STEP 804; placing the ciphered data in a designated location, STEP 806; authenticating an additional set of data provided by the instruction, the authenticating generating at least a part of a message authentication tag, STEP 808; and storing the at least a part of the message authentication tag in a selected location, STEP 810. In a further embodiment, the executing further includes authenticating the ciphered data, STEP 812.

In one example, the additional set of data includes at least one block of data of one or more blocks of data (814), and the executing further includes determining whether the additional set of data includes a last block of data to be authenticated, STEP 816; and performing the authenticating based on whether the additional set of data includes the last block of data to be authenticated, STEP 818.

The determining includes, for instance, checking a last additional authenticated data control of the instruction to determine whether the additional set of data includes the last block of data to be authenticated, STEP 820.

Further, in one example, referring to FIG. 8B, the one set of data includes at least one block of data of one or more blocks of data (822), and the executing further includes determining whether the one set of data includes a last block of data to be ciphered, STEP 824, and performing the ciphering based on whether the one set of data includes the last block of data to be ciphered, STEP 826.

The determining includes, for instance, checking a last text control of the instruction to determine whether the one set of data includes the last block of data to be ciphered, STEP 828.

As examples, the ciphering includes encrypting the one set of data based on a control provided by the instruction being set to a selected value, STEP 830, or decrypting the one set of data based on a control provided by the instruction being set to a particular value, STEP 832.

In one embodiment, the authenticating of the additional set of data includes using a hash technique to generate the at least a part of the message authentication tag, STEP 834. Further, in one embodiment, the hash technique uses a hash subkey stored in a parameter block used by the instruction, based on a hash subkey supplied control of the instruction being set to a chosen value, STEP 836.

As an example, the one set of data includes at least a portion of a message, and the additional set of data includes routing information for the message 840.

As described herein, in one example, a single instruction is provided that is configured to perform: generating a message digest (i.e., hashing) of additional authenticated data; ciphering of a message; and generating a message digest of the encrypted message. In other examples, one or more of the functions may not be provided.

In one example the instruction uses an:

HS flag that allows the program to indicate that it has provided its own hash subkey. This provides a performance benefit, if using the same hash subkey. The hash subkey is computed (and not stored) for encrypted key functions.

LAAD flag that indicates that the final block of additional authenticated data has been provided. This allows a single instruction to handle first, intermediate, and final blocks of additional authenticated data.

LPC flag that indicates that the final block of plaintext/ciphertext has been provided. This allows a single instruction to handle first, intermediate, and final blocks of plaintext/ciphertext; and in conjunction with LAAD, provides some validity checking for instruction usage.

Aspects of the invention are inextricably tied to computer technology, improving processing within a computing environment, including but not limited to, processing associated with security, such as with data encryption/decryption and/or authentication, etc.

Many variations are possible, including, but not limited to, using other encryption techniques, such as the Data Encryption Standard (DES) or others, and/or other hashing techniques, such as SHA (Secure Hash Algorithm)-2, SHA-3 or others.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing in a computing environment, the computer program product comprising:

a computer readable storage medium readable by a processing circuit and storing instructions for execution by the processing circuit for performing a method comprising:

obtaining an instruction to perform a plurality of operations, including ciphering and authentication; and executing the instruction, the executing including:

ciphering one set of data provided by the instruction to obtain ciphered data;

placing the ciphered data in a designated location;

authenticating an additional set of data provided by the instruction, the authenticating generating at least a part of a message authentication tag; and storing the at least a part of the message authentication tag in a selected location.

2. The computer program product of claim 1, wherein the executing further comprises authenticating the ciphered data.

3. The computer program product of claim 1, wherein the additional set of data includes at least one block of data of one or more blocks of data, and wherein the executing further includes:

determining whether the additional set of data includes a last block of data to be authenticated; and performing the authenticating based on whether the additional set of data includes the last block of data to be authenticated.

4. The computer program product of claim 3, wherein the determining comprises checking a last additional authenticated data control of the instruction to determine whether the additional set of data includes the last block of data to be authenticated.

5. The computer program product of claim 1, wherein the one set of data includes at least one block of data of one or more blocks of data, and wherein the executing further includes:

determining whether the one set of data includes a last block of data to be ciphered; and performing the ciphering based on whether the one set of data includes the last block of data to be ciphered.

6. The computer program product of claim 5, wherein the determining comprises checking a last text control of the instruction to determine whether the one set of data includes the last block of data to be ciphered.

7. The computer program product of claim 1, wherein the ciphering includes encrypting the one set of data based on a control provided by the instruction being set to a selected value.

8. The computer program product of claim 1, wherein the ciphering includes decrypting the one set of data based on a control provided by the instruction being set to a particular value.

9. The computer program product of claim 1, wherein the authenticating of the additional set of data includes using a hash technique to generate the at least a part of the message authentication tag.

10. The computer program product of claim 9, wherein the hash technique uses a hash subkey stored in a parameter block used by the instruction, based on a hash subkey supplied control of the instruction being set to a chosen value.

11. The computer program product of claim 1, wherein the one set of data includes at least a portion of a message and the additional set of data includes routing information for the message.

12. A computer system for facilitating processing in a computing environment, the computer system comprising:
a memory; and
a processor in communication with the memory, wherein the computer system is configured to perform a method, the method comprising:
obtaining an instruction to perform a plurality of operations, including ciphering and authentication; and
executing the instruction, the executing including:
ciphering one set of data provided by the instruction to obtain ciphered data;
placing the ciphered data in a designated location;
authenticating an additional set of data provided by the instruction, the authenticating generating at least a part of a message authentication tag; and
storing the at least a part of the message authentication tag in a selected location.

13. The computer system of claim 12, wherein the executing further comprises authenticating the ciphered data.

14. The computer system of claim 12, wherein the additional set of data includes at least one block of data of one or more blocks of data, and wherein the executing further includes:
determining whether the additional set of data includes a last block of data to be authenticated, the determining checking a last additional authenticated data control of the instruction to determine whether the additional set of data includes the last block of data to be authenticated; and
performing the authenticating based on whether the additional set of data includes the last block of data to be authenticated.

15. The computer system of claim 12, wherein the one set of data includes at least one block of data of one or more blocks of data, and wherein the executing further includes:
determining whether the one set of data includes a last block of data to be ciphered, the determining checking a last text control of the instruction to determine whether the one set of data includes the last block of data to be ciphered; and
performing the ciphering based on whether the one set of data includes the last block of data to be ciphered.

16. The computer system of claim 12, wherein the authenticating of the additional set of data includes using a hash technique to generate the at least a part of the message authentication tag, and wherein the hash technique uses a hash subkey stored in a parameter block used by the instruction, based on a hash subkey supplied control of the instruction being set to a chosen value.

17. A computer-implemented method of facilitating processing in a computing environment, the computer-implemented method comprising:
obtaining, by a processor, an instruction to perform a plurality of operations, including ciphering and authentication; and
executing the instruction, the executing including:
ciphering one set of data provided by the instruction to obtain ciphered data;
placing the ciphered data in a designated location;
authenticating an additional set of data provided by the instruction, the authenticating generating at least a part of a message authentication tag; and
storing the at least a part of the message authentication tag in a selected location.

18. The computer-implemented method of claim 17, wherein the executing further comprises authenticating the ciphered data.

19. The computer-implemented method of claim 17, wherein the additional set of data includes at least one block of data of one or more blocks of data, and wherein the executing further includes:
determining whether the additional set of data includes a last block of data to be authenticated, the determining checking a last additional authenticated data control of the instruction to determine whether the additional set of data includes the last block of data to be authenticated; and
performing the authenticating based on whether the additional set of data includes the last block of data to be authenticated.

20. The computer-implemented method of claim 17, wherein the one set of data includes at least one block of data of one or more blocks of data, and wherein the executing further includes:
determining whether the one set of data includes a last block of data to be ciphered, the determining checking a last text control of the instruction to determine whether the one set of data includes the last block of data to be ciphered; and
performing the ciphering based on whether the one set of data includes the last block of data to be ciphered.

* * * * *